US012201564B1

(12) United States Patent
Estrada et al.

(10) Patent No.: US 12,201,564 B1
(45) Date of Patent: Jan. 21, 2025

(54) TREATMENT DEVICE WITH ADJUSTABLE SUPPORT CAPABILITIES

(71) Applicant: Earthlite, LLC, Vista, CA (US)

(72) Inventors: Richard Estrada, Oceanside, CA (US); Angel Angeles, Escondido, CA (US); Garth Weber, Fallbrook, CA (US); James Chenevey, Encinitas, CA (US)

(73) Assignee: EARTHLITE, LLC, Vista, CA (US)

( * ) Notice: Subject to any disclaimer, the term of this patent is extended or adjusted under 35 U.S.C. 154(b) by 0 days.

(21) Appl. No.: 18/729,405

(22) PCT Filed: Nov. 20, 2023

(86) PCT No.: PCT/US2023/080563
§ 371 (c)(1),
(2) Date: Jul. 16, 2024

(87) PCT Pub. No.: WO2024/118380
PCT Pub. Date: Jun. 6, 2024

Related U.S. Application Data

(63) Continuation of application No. 18/513,192, filed on Nov. 17, 2023.
(Continued)

(51) Int. Cl.
*A61G 13/00* (2006.01)
*A61G 13/08* (2006.01)

(52) U.S. Cl.
CPC ........... *A61G 13/009* (2013.01); *A61G 13/08* (2013.01)

(58) Field of Classification Search
CPC ...... A61G 13/00; A61G 13/02; A61G 13/009; A61G 13/08
See application file for complete search history.

(56) References Cited

U.S. PATENT DOCUMENTS

| | | | |
|---|---|---|---|
| 1,617,593 | A | 2/1927 | Hardy |
| 1,762,944 | A | 6/1930 | Allison |

(Continued)

FOREIGN PATENT DOCUMENTS

| | | | |
|---|---|---|---|
| AU | 2009238320 | A1 | 11/2009 |
| DE | 2027767 | | 12/1971 |

(Continued)

OTHER PUBLICATIONS

International Search Report and Written Opinion issued by the ISA/EU for international application serial No. PCT/US2023/080563, dated Mar. 7, 2024. (related matter).

*Primary Examiner* — Fredrick C Conley
(74) *Attorney, Agent, or Firm* — ROEDER & BRODER LLP; Steven G. Roeder

(57) ABSTRACT

A treatment device (12) for supporting a user (10) during a therapeutic treatment includes a device body (216) and an actuator assembly (222). The device body (216) is configured to support the user (10) during the therapeutic treatment. The device body (216) includes a first body section (224) that supports at least a portion of the user (10) during the therapeutic treatment. The first body section (224) has (i) a rigid, section base (228). (ii) a first resilient layer (230A) that is positioned on top of the section base (228), the first resilient layer (230A) including a first support region (224F) and a second support region (224S), and (iii) a section cover (232) that covers the first resilient layer (230A), the section cover (232) being adapted to engage the user (10). The actuator assembly (222) is configured to selectively deform the second support region (224S) relative to the first support region (224F).

27 Claims, 18 Drawing Sheets

Related U.S. Application Data

(60) Provisional application No. 63/468,150, filed on May 22, 2023, provisional application No. 63/428,279, filed on Nov. 28, 2022.

(56) References Cited

U.S. PATENT DOCUMENTS

| | | | |
|---|---|---|---|
| 2,702,733 | A | 2/1955 | Lorang |
| 2,833,587 | A | 5/1958 | Saunders |
| 2,926,660 | A | 3/1960 | Thompson |
| 3,226,106 | A | 12/1965 | Johnson et al. |
| 3,795,018 | A | 3/1974 | Broaded |
| 4,190,043 | A | 2/1980 | Thompson |
| 4,451,945 | A | 6/1984 | Heinz et al. |
| 4,556,198 | A | 12/1985 | Tominaga |
| 4,596,384 | A | 6/1986 | Blosser |
| 4,984,774 | A | 1/1991 | Zupancic et al. |
| 5,009,170 | A | 4/1991 | Spehar |
| 5,088,475 | A | 2/1992 | Steffensmeier |
| 5,438,715 | A | 8/1995 | Jackman |
| 5,820,573 | A | 10/1998 | Ramos |
| 6,163,904 | A | 12/2000 | Royston |
| 6,190,338 | B1 | 2/2001 | Arndt |
| 6,408,470 | B1 | 6/2002 | Powers |
| 6,684,431 | B2 | 2/2004 | Splane, Jr. |
| 6,934,988 | B1 | 8/2005 | Wetzler et al. |
| 7,080,420 | B2 | 7/2006 | Damron |
| 7,127,764 | B1 | 10/2006 | Harding et al. |
| 7,424,759 | B2 | 9/2008 | Damron |
| 7,636,967 | B1 | 12/2009 | Stokes |
| 7,698,761 | B2 | 4/2010 | Neuenswander et al. |
| 9,072,645 | B2 | 7/2015 | Gamman |
| 9,295,602 | B2 | 3/2016 | Savich |
| 9,925,108 | B2 | 3/2018 | Savich |
| 11,207,233 | B2 | 12/2021 | Savich |
| 2004/0172064 | A1 | 9/2004 | MacDonald |
| 2006/0225214 | A1 | 10/2006 | Damron |
| 2006/0288484 | A1 | 12/2006 | Roleder et al. |
| 2007/0163049 | A1 | 7/2007 | Brinkerhoff et al. |
| 2007/0214571 | A1 | 9/2007 | Piraino |
| 2008/0016616 | A1 | 1/2008 | Roleder et al. |
| 2009/0077749 | A1 * | 3/2009 | Roleder ................. A61G 13/12 5/637 |
| 2009/0211584 | A1 | 8/2009 | Savich |
| 2010/0263125 | A1 | 10/2010 | Roleder et al. |
| 2010/0299835 | A1 * | 12/2010 | Andrews .............. A61G 13/009 5/622 |
| 2010/0325798 | A1 * | 12/2010 | Savich ................. A61G 13/009 5/615 |
| 2012/0060291 | A1 | 3/2012 | Gamman et al. |
| 2015/0265484 | A1 | 9/2015 | Riach |
| 2018/0153756 | A1 | 6/2018 | Savitch |

FOREIGN PATENT DOCUMENTS

| | | | |
|---|---|---|---|
| DE | 19746340 | A1 | 6/1999 |
| DE | 29916544 | U1 | 7/2000 |
| DE | 202006015210 | U1 | 3/2007 |
| EP | 0568957 | A1 | 11/1993 |
| EP | 0655233 | A1 | 5/1995 |
| FR | 2581865 | A1 | 11/1986 |
| FR | 2585562 | A1 | 2/1987 |
| JP | 2022068094 | A | 5/2022 |
| KR | 20090131603 | A | 12/2009 |
| WO | WO 01/08621 | A2 | 2/2001 |
| WO | WO2006041436 | A1 | 4/2006 |
| WO | WO2009042706 | A1 | 4/2009 |

* cited by examiner

TREATMENT DEVICE WITH ADJUSTABLE SUPPORT CAPABILITIES

RELATED APPLICATION

This application claims priority on U.S. Application Ser. No. 18/513,192, filed Nov. 17, 2023, and entitled "TREATMENT DEVICE WITH ADJUSTABLE SUPPORT CAPABILITIES". Also, this application claims priority on U.S. Provisional Application No. 63/468,150, filed May 22, 2023, entitled "TREATMENT DEVICE WITH ADJUSTABLE SUPPORT CAPABILITIES". Additionally, this application claims priority on U.S. Provisional Application No. 63/428,279, filed Nov. 28, 2022, entitled "TREATMENT DEVICE WITH ADJUSTABLE SUPPORT CAPABILITIES". As far as permitted, the contents of U.S. Application Ser. No. 18/513,192, U.S. Provisional Application No. 63/468,150, and U.S. Provisional Application No. 63/428,279 are incorporated in their entirety herein by reference.

BACKGROUND

As the benefits of therapeutic treatments such as therapeutic massage and/or other comparable therapeutic treatments are becoming more widely appreciated, more and more people are participating in such therapeutic treatments. A typical treatment table or treatment chair (also collectively referred to herein generally as a "treatment device") designed for use during therapeutic massage or other comparable therapeutic treatments allows a patient to be resting while receiving a massage or other treatment.

When such therapeutic treatments are being performed, there is a general desire to achieve appropriate comfort and convenience for the patient who is receiving the therapeutic treatment. This can be especially true for the patient who is in a prone position during the therapeutic treatment. For example, with traditional treatment devices, the breasts of the patient can cause undesired discomfort for the patient who is in the prone position during the therapeutic treatment. Additionally, with traditional treatment devices, the stomach of the patient (such as for a pregnant patient) can also cause undesired discomfort for the patient who is in the prone position during the therapeutic treatment. Thus, it is desired to provide a means to ensure that patients are able to experience appropriate comfort and convenience while receiving any such therapeutic treatments.

SUMMARY

The present invention is directed to a treatment device for supporting a user during a therapeutic treatment. In various embodiments, the treatment device includes a device body and an actuator assembly. The device body is configured to support the user during the therapeutic treatment. The device body includes a first body section that is adapted to support at least a portion of the user during the therapeutic treatment. The first body section has (i) a rigid, section base, (ii) a first resilient layer that is positioned on top of the section base, the first resilient layer including a first support region and a second support region, and (iii) a section cover that covers the first resilient layer and secures the first resilient layer to the section base, the section cover being adapted to engage the user. The actuator assembly is configured to selectively deform the second support region relative to the first support region.

With this design, actuator assembly can be controlled to selectively adjust the support provided by the treatment device by selectively deforming the second support region. As a result thereof, the support provided by the treatment device can be adjusted to suit the needs of the user.

In certain embodiments, the actuator assembly is configured to selectively deform the second support region relative to the section base.

In some embodiments, the actuator assembly is configured to selectively deform the second support region relative to the section cover.

In certain embodiments, the first body section includes a second resilient layer that covers the first resilient layer and that is positioned between the first resilient layer and the section cover. In one embodiment, the actuator assembly is configured to selectively deform the second support region relative to the second resilient layer.

In some embodiments, at least one of the resilient layers is a continuous piece of foam.

In other embodiments, each of the resilient layers is a continuous piece of foam.

In some embodiments, the first body section includes a third resilient layer that is positioned between the first resilient layer and the section base. In one embodiment, the actuator assembly is configured to selectively deform a portion of the third resilient layer concurrently with the selective deformation of the second support region of the first resilient layer.

In one embodiment, the actuator assembly includes (i) an engagement member positioned between the first resilient layer and the second resilient layer; (ii) an actuator subassembly that is positioned below the second resilient layer; and (iii) a plurality of spaced apart, member connectors that connect the engagement member to the actuator subassembly through the first resilient layer. In certain embodiments, the actuator subassembly is controlled to selectively pull the engagement member via the member connectors to selectively deform the second support region.

In some embodiments, the member connectors connect the engagement member to the actuator subassembly through the second support region of the first resilient layer.

In certain embodiments, the engagement member is formed from a felt material. In other embodiments, the engagement member is formed from a rigid material.

In some embodiments, the actuator assembly further includes a first housing member and a second housing member that are positioned to at least partially surround the actuator subassembly.

In certain embodiments, is movably coupled to the second housing member.

In some embodiments, the first housing member is telescopingly coupled to the second housing member.

In certain embodiments, the first resilient layer includes (i) a first layer section that includes at least a portion of the first support region, and (ii) a second layer section that includes at least a portion of the second support region. In some embodiments, the first layer section has a first layer resilience that is different from a second layer resilience of the second layer section.

In one embodiment, the first resilient layer includes a layer relief that influences the deformation of the second support region relative to the first support region.

In some embodiments, the actuator assembly includes (i) an engagement member that is positioned between the first resilient layer and the section cover; (ii) an actuator subassembly, at least a portion of the actuator subassembly being positioned below the section base; and (iii) a plurality of spaced apart, member connectors that connect the engagement member to the actuator subassembly through the first resilient layer. In certain embodiments, the actuator subassembly is controlled to selectively pull the engagement member via the member connectors to selectively deform the second support region.

In many embodiments, the actuator subassembly includes (i) an actuator, (ii) one or more actuator drive components, and (iii) an actuator adapter that couples the connectors to the actuator.

In certain embodiments, the second support region is substantially oval-shaped.

In other embodiments, the second support region is shaped similar to a pair of circles.

In some embodiments, the device body includes a second body section that is adapted to support at least a second portion of the user during the therapeutic treatment; and at least one of the body sections is configured to be selectively moved relative to the other body section.

In various embodiments, the treatment device further includes an assembly controller that is configured to control operation of the actuator assembly.

In another implementation, a method for supporting a user includes: (i) supporting the user during the therapeutic treatment with a device body having a rigid, section base; a first resilient layer that is positioned on top of the section base, the first resilient layer including a first support region and a second support region; and a section cover that covers the first resilient layer, the section cover being adapted to engage the user; and (ii) selectively deforming the second support region relative to the first support region.

In yet another implementation, a treatment device for supporting a user during a therapeutic treatment includes: (i) a device body that is configured to support the user during the therapeutic treatment, the device body having a rigid, section base; a first resilient layer that is positioned on top of the section base; and a section cover that covers the first resilient layer, the section cover being adapted to engage the user; and (ii) an actuator assembly that is configured to selectively deform at least a portion of the first resilient layer to selectively adjust the support characteristics of the device body.

For example, the actuator assembly can selectively deform at least a portion of the first resilient layer relative to the section base. Additionally, or alternatively, the actuator assembly can selectively deform at least a portion of the first resilient layer relative to and independently of the section cover.

In still another implementation, a method for supporting a user includes: (i) supporting the user during the therapeutic treatment with a device body that includes a rigid, section base; a first resilient layer that is positioned on top of the section base; and a section cover that covers the first resilient layer, the section cover being adapted to engage the user; and (ii) selectively deforming at least a portion of the first resilient layer relative to the section base to selectively adjust the support characteristics of the device body.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a treatment device 12 that is configured to support a user 10 above and/or relative to a surface 14 while receiving a therapeutic treatment or another procedure. In particular, the treatment device 12 is uniquely configured to provide adjustable support capabilities, and thus enhanced comfort and convenience for the user 10, such as when the user 10 is positioned in a prone position while receiving the therapeutic treatment.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar nomenclature and/or reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
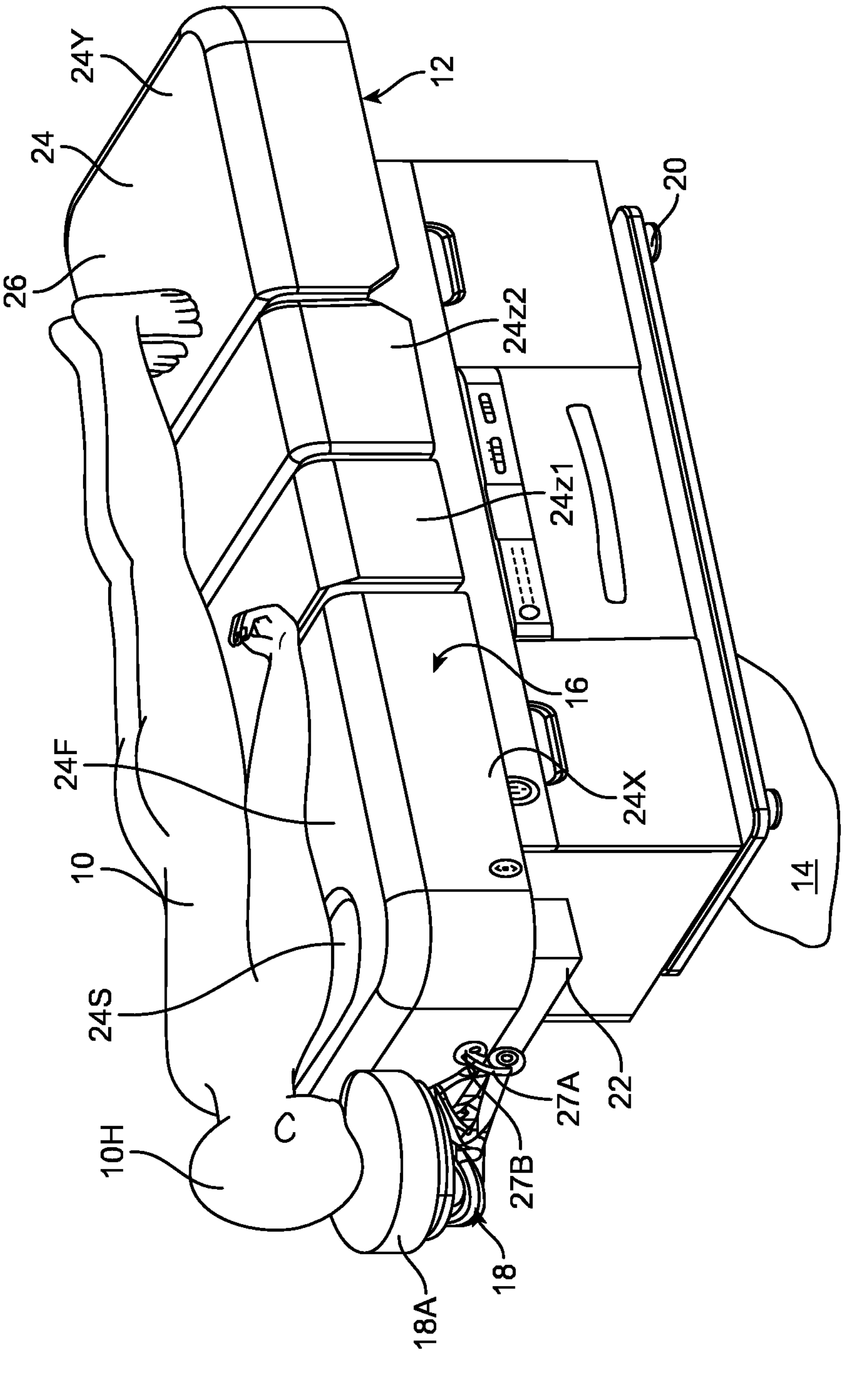
FIG. 1 is a perspective view illustration of a user and an embodiment of a treatment device having features of the present invention, the treatment device including a device body that includes one or more body sections.

FIG. 1 is a perspective view illustration of a user 10, such as a therapeutic treatment recipient or patient, and a non-exclusive embodiment of a treatment device 12 having features of the present invention. In various embodiments, the treatment device 12 is configured to support the user 10 of the treatment device 12 above and/or relative to the surface 14 as the user 10 is receiving a massage or other therapeutic treatment.

The design of the treatment device 12 can be varied to suit the needs of the user 10. In one implementation, the treatment device 12 includes a device body 16, a headrest assembly 18 that is coupled to the device body 16, and a device support assembly 20 that supports the device body 16 above and/or relative to the surface 14. Additionally, in many embodiments, the treatment device 12 can include an actuator assembly 22 that is operatively coupled to the device body 16 to provide adjustable support capabilities, and thus enhanced the comfort and convenience for the user 10 as the user 10 is positioned on the treatment device 12. More specifically, in certain implementations, the device body 16 includes a first support region 24F, and a second support region 24S, and the actuator assembly 22 is configured to selectively deform the second support region 24S of the device body 16 relative to the first support region 24F. Alternatively, the treatment device 12 can include more components or fewer components than those specifically illustrated in FIG. 1. For example, in one non-exclusive alternative embodiment, the treatment device 12 can be configured without the headrest assembly 18. Still alternatively, the headrest assembly 18 can be integrated into the device body 16.

As an overview, the unique design of the treatment device 12 provided herein, allows for the treatment device 12 to be selectively adjusted in an improved fashion to improve the comfort of the user 10. Stated differently, in certain implementations, the actuator assembly 22 that is controlled to selectively deform the second support region 24S relative to the first support region 24F so as to provide enhanced comfort and convenience for the user 10, such as when the user 10 is positioned in a prone position while receiving the therapeutic treatment.

As illustrated in FIG. 1, the treatment device 12 is shown as a treatment table that supports the user 10, with the user 10 lying down, e.g., in the prone position, for purposes of receiving the therapeutic treatment. However, it is appreciated that the treatment device 12 can have another suitable design, and does not have to be provided in the form of a treatment table. For example, in one non-exclusive alternative embodiment, the treatment device 12 can be a treatment chair or another structure.

The device body 16 includes at least one body section 24 that is configured to support the user 10 as the user 10 receives the therapeutic treatment. For example, in certain embodiments, the device body 16 includes a plurality of body sections 24 that are coupled to the device support assembly 20. Further, in certain implementations, one or more of the body sections 24 is independently movably relative to each other and/or the device support assembly 20. In one embodiment, the device body 16 includes two body sections 24 that are movably coupled to one another, such as with a hinge (not shown), so as to enable the device body 16 to be folded in half so that it is more compact for ease of transportation and/or storage.

Alternatively, as shown in FIG. 1, the device body 16 can be provided in a spa table arrangement in which one or more of the body sections 24, such as a first body section 24X, a second body section 24Y, a third body section 24*z*1, and a fourth body section 24*z*2. In this design, one or more of the body sections 24X, 24Y, 24*z*1, 24*z*2 can be selectively movable relative to the surface 14 and/or relative to one another to provide a reclining surface, and/or lifting of the patient.

Alternatively, the device body 16 can include more than four or fewer than four body sections 24. For example, the device body 16 can be formed as a single body section 24 that is not foldable.

In one embodiment, the device body 16 is substantially rectangle-shaped. Alternatively, the device body 16 can have another suitable shape. For example, in certain non-exclusive alternative embodiments, the device body 16 can be substantially oval-shaped, oblong-shaped, rectangular-shaped with one or more rounded corners, or another suitable shape.

In certain embodiments, the device body 16 can include a body base (not shown in FIG. 1) or body frame, at least one resilient layer (not shown in FIG. 1), and a body cover 26. For example, the user 10 can contact the body cover 26.

The body base supports the user 10 receiving the therapeutic treatment when the user 10 is positioned on the treatment device 12. The body base is generally rigid and can be made of a rigid material such as wood, aluminum, steel, plastic, or other suitable materials. In alternative, non-exclusive embodiments, the body base has a thickness of approximately 0.2, 0.3, 0.4, 0.5, 0.6, 0.7, 0.8, or 1 inches. However, other thicknesses can be utilized.

The at least one resilient layer is secured to and/or can be positioned substantially on top of the body base. The at least one resilient layer provides a cushion for the comfort of the user 10 resting on the treatment device 12. In various embodiments, as described in greater detail herein below, one or more support regions of the at least one resilient layer can be selectively deformed, such as through use of the actuator assembly 22, to provide enhanced comfort and convenience for the user 10 as the user 10 is positioned on the treatment device 12 while receiving the therapeutic treatment. Non-exclusive examples of suitable materials for the at least one resilient layer include foam, memory foam, gel, fleece pads, etc.

The body cover 26 covers the at least one resilient layer and secures the at least one resilient layer to the body base, thus providing a protective covering for the at least one resilient layer. Non-exclusive examples of suitable materials for the body cover 26 include leather, leather-like materials, plastic, or cloth.

Importantly, in various embodiments, the treatment device 12 further includes the actuator assembly 22 that is operatively coupled to the device body 16 to provide enhanced comfort and convenience for the user 10 as the user 10 is positioned on the treatment device 12. More specifically, as provided herein, the actuator assembly 22 can be configured to selectively deform the second support region 24S relative to the first support region 24F to enable the user 10 to be positioned comfortably and conveniently in the prone position while on the treatment device 12. The design of the actuator assembly 22 and the size and positioning of the support regions 24F, 24S can be varied to suit the requirements of the treatment device 12 and/or the specifications of the user 10 of the treatment device 12. Certain non-exclusive implementations of the device body 16 and/or the actuator assembly 22 will be illustrated and described in greater detail herein below.

As noted above, the headrest assembly 18 is coupled to the device body 16. The headrest assembly 18 is configured to support a head 10H of the user 10 as the user 10 is positioned on the device body 16 for purposes of receiving the therapeutic treatment. The headrest assembly 18 can have any suitable design and can be coupled to the device body 16 in any suitable manner. In various embodiments, the headrest assembly 18 can include one or more of a pad (not shown), and a covering 18A. Additionally, or in the alternative, in some embodiments, the headrest assembly 18 can further include a rigid support frame (not shown) to more rigidly support the head 10H of the user 10 as the user 10 is positioned on the treatment device 12. In such embodiments, the rigid support frame can be formed from one or more of wood, aluminum, steel, plastic or other suitable materials. The pad provides a cushion for the comfort of the head 10H of the user 10 as the user 10 is positioned on the treatment device 12. Non-exclusive examples of suitable materials for the pad include foam, memory foam, fleece pads, etc. Additionally, the covering 18A is positioned about the pad and provides a protective covering for the pad. Non-exclusive examples of suitable materials for the covering 18A include leather, leather-like materials, plastic, and cloth.

In certain embodiments, the headrest assembly 18 can be substantially horseshoe-shaped. It is appreciated that the substantially horseshoe-shaped configuration of the headrest assembly 18 is designed to define an opening to comfortably receive at least a portion of the head 10H of the user 10.

In some embodiments, the headrest assembly 18 can include one or more, e.g., two, headrest coupling arms 27A that are configured to be received within corresponding headrest receiving apertures 27B that are formed into the device body 16, in order to effectively and selectively couple the headrest assembly 18 to the device body 16. Alternatively, the headrest assembly 18 can be coupled to the device body 16 in another suitable manner.

As noted above, the device support assembly 20 supports the device body 16 above and/or relative to the surface 14. More particularly, the device support assembly 20 extends between the device body 16 and the surface 14 to maintain the device body 16 positioned above and away from the surface 14. It is appreciated that the device support assembly 20 can have any suitable design for purposes of supporting the device body 16 above the surface 14. For example, in one embodiment, the device support assembly 20 can include one or more legs and/or feet that are fairly lightweight, but still provide desired stability for the treatment device 12. Alternatively, the device support assembly 20 can have another suitable design. Additionally, or in the alternative, the device support assembly 20 can be configured as a base that provides one or more storage compartments, e.g., drawers, that are usable for storage of materials that can be used during any therapeutic treatments. Further, as with the device body 16, in certain embodiments, the device support assembly 20 can be configured to be foldable and/or collapsible so that the treatment device 12 can be quickly and easily folded up for ease of transportation and/or storage.

Figure 2A:
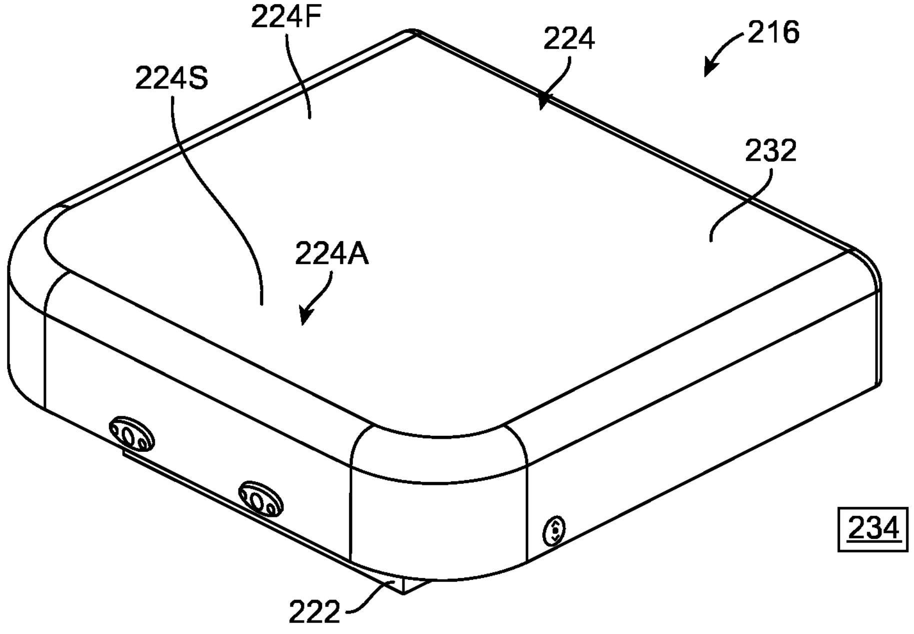
FIG. 2A is a simplified top perspective view illustration of an embodiment of a body section of the device body that can be included as part of the treatment device illustrated in FIG. 1, the body section being shown in a first (home) position, and an embodiment of an actuator assembly that is configured to selectively deform a portion of the body section.

FIG. 2A is a simplified top perspective view illustration of an embodiment of a body section 224 of the device body 216, such as the first body section 24X shown in FIG. 1, that can be included as part of the treatment device 12 illustrated in FIG. 1 or another type of treatment device. Additionally, FIG. 2A illustrates an embodiment of the actuator assembly 222 that can be included as part of the treatment device 12 for purposes of selectively deforming a portion of the body section 224.

As provided above, the body section 224 is adapted to support at least a portion of the user 10 (illustrated in FIG. 1) when the user 10 is positioned on the device body 216 for purposes of receiving a therapeutic treatment. In FIG. 2A, the body section 224 is shown in a first (home or undeformed) position 224A in which the actuator assembly 222 has not selectively deformed any portion of the body section 224. More specifically, at this time, the actuator assembly 222 has not selectively deformed the second support region 224S relative to the first support region 224F.

In various embodiments, the body section 224 includes a rigid, section base 228 (illustrated, for example, in FIG. 2C), one or more resilient layers 230 (illustrated, for example, in FIG. 2C) that are positioned on top of the section base 228, and a section cover 232 that covers the at least one resilient layer 230 and secures the at least one resilient layer 230 to the section base 228. The section cover 232 is adapted to engage the user 10 when the user 10 is positioned on top of the treatment device 12.

The actuator assembly 222 can be operatively coupled to the body section 224 for purposes of selectively deforming the second support region 224S relative to the first support region 224F. However, in certain implementations, regardless of whether the body section 224 is in the first (home or undeformed) position 224A, or in a second (deformed) position 224B (illustrated in FIG. 2B), the section cover 232 does not naturally deform without the user 10 being positioned thereon or some other type of pressure pushing down onto the section cover 232.

FIG. 2A further illustrates an assembly controller 234 (illustrated as a box) that is configured to allow a person to control operation of the actuator assembly 222. In particular, the assembly controller 234 can be configured to control the actuator assembly 222 to selectively deform one or more regions of the at least one resilient layer 230 relative to the remainder of the at least one resilient layer 230. It should be noted that the assembly controller 234 can be a remote controller that wirelessly controls the actuator assembly 222 or a tethered controller. Still alternatively, the assembly controller 234 can be integrated into the treatment device 12.

Figure 2B:
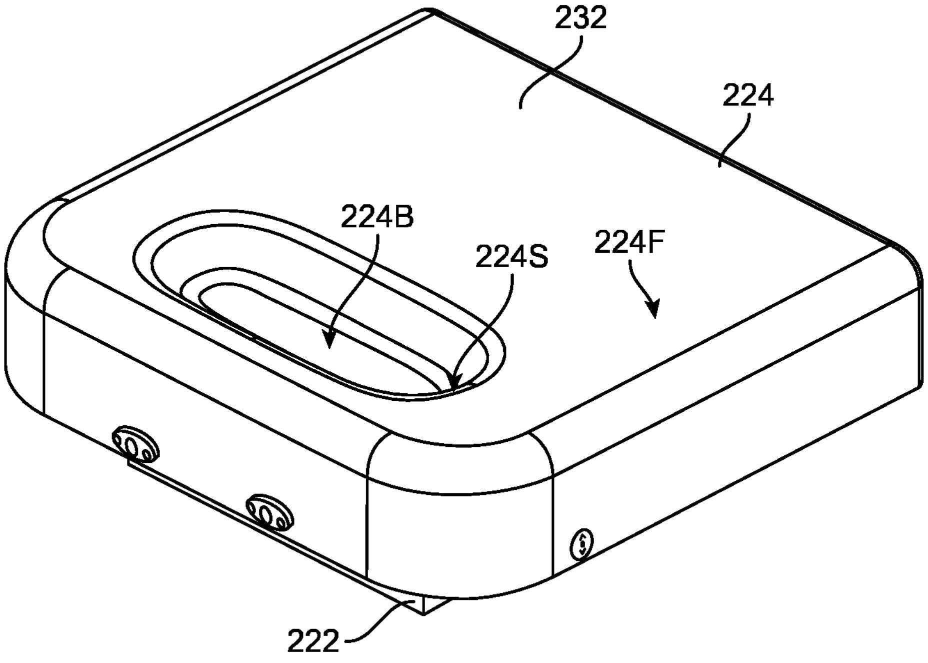
FIG. 2B is a simplified top perspective view illustration of a portion of the body section and the actuator assembly illustrated in FIG. 2A, the body section being shown in a second (deformed) position.

FIG. 2B is a simplified top perspective view illustration of the portion of the body section 224 illustrated in FIG. 2A. As illustrated in FIG. 2B, the body section 224 is shown in the second (deformed) position 224B with the second support region 224S being deformed relative to the first support region 224F. More particularly, FIG. 2B illustrates what the body section 224 would look like with the body section 224 in the second (deformed) position 224B and with a force (such as from the breasts of the user 10 (illustrated in FIG. 1)) pushing down on the section cover 232. As noted above, it is appreciated that in certain embodiments, the section cover 232 will appear to be flat, normal and undisturbed/undeformed from the top, even when in the second (deformed) position, unless an outside force (such as the breasts of the user 10) is pushing down on the section cover 232. Alternatively, for example, the section cover 232 can droop slightly when the second support region 224S is deformed and in the second position 224B, and no outside force is pushing on the section cover 232.

The size and shape (i.e. a deformation profile) of the second support region 224S and the specific location of the second support region 224S can be varied to achieve the design requirements of the treatment device 12. For example, the size, shape, location of the second support region 224S can be selected based on (i) the size and shape of the user 10, (ii) the area and/or body parts of the user 10 that are being adjustably supported within the second support region 224S, and (iii) the specific operation and design of the actuator assembly 222. For example, in one non-exclusive embodiment, the second support region 224S can be substantially oval-shaped and can be positioned so as to effectively align with the breasts of the user 10 of the treatment device 12.

Alternatively, for another manner of supporting the breasts of the user 10 of the treatment device 12, the second support region 224S can be shaped similar to a pair of circles, ovals, half-circles or half-ovals (such as with spacing in between to support the sternum of the user 10). Still alternatively, the second support region 224S can again be substantially oval-shaped, but can be positioned in a different manner and/or can be of a different size, so as to effectively align with the stomach of the user 10 of the treatment device 12. Having a deformable second support region 224S in the stomach area can be valuable in situations such as when the user of the treatment device 12 is pregnant. Yet alternatively, the body section 224 can be designed to include multiple, second support regions 224S. For example, the body section 224 can be designed to include a selectively deformable second support region 224S for the breasts, and another, selectively deformable second support region (not shown) for the stomach of the user 10.

Figure 2C:
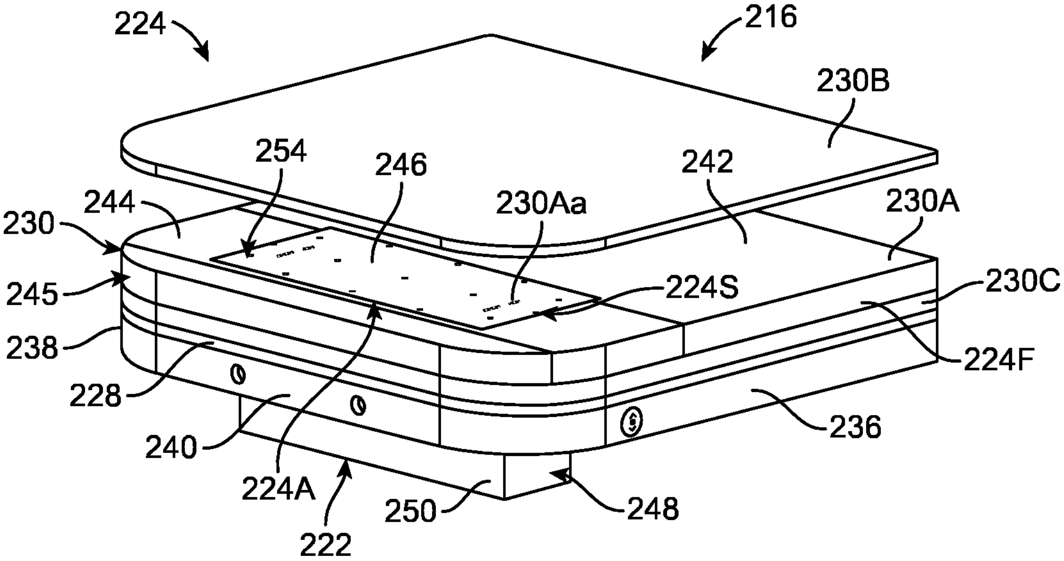
FIG. 2C is a partially exploded top perspective view illustration of a portion of the body section and the actuator assembly illustrated in FIG. 2A.

FIG. 2C is a partially exploded top perspective illustration of a portion of the body section 224 from FIG. 2A. It should be noted that the cover section 232 (illustrated in FIGS. 2A and 2B) has been omitted from FIG. 2C for purposes of clarity. As a result, FIG. 2C illustrates the section base 228, the resilient layers 230, and the actuator assembly 222 in more detail. In FIG. 2C, the second support region 224S is not compressed (deformed) and is in the first position 224A. The design of the body section 224 can be varied, and can be formed to make up a portion of, such as half, one-quarter, or all of the device body 216.

As noted above, in various embodiments, the body section 224 can include one or more of the rigid, section bases 228, one or more resilient layers 230, and the section cover 232 (not shown in FIG. 2C). As also shown in FIG. 2C, the body section 224 can further include a first side flange 236, a second side flange 238, and a first end flange 240 that are fixedly secured to, and provide support to the section base 228. More specifically, in FIG. 2C, the first side flange 236, the second side flange 238 and the first end flange 240 are each positioned adjacent to a bottom surface 228A (illustrated in FIG. 2D) of the section base 228, and extend in a generally downward direction away from the section base 228. The flanges 236, 238, 240 can be fixedly secured to body section 224 to provide additional structural support, and also help to provide certain protection for portions of the actuator assembly 222, which are also positioned near and/or adjacent to the bottom surface 228A of the section base 228. The flanges 236, 238, 240 can be formed from any suitable materials. For example, each of the flanges 236, 238, 240 can be generally rigid and can be made of a rigid material such as wood, aluminum, steel, plastic, or other suitable materials. In alternative, non-exclusive embodiments, each of the flanges 236, 238, 240 has a thickness of approximately 0.2, 0.3, 0.4, 0.5, 0.6, 0.7, 0.8, or 1 inches. However, other thicknesses can be utilized.

Alternatively, the body section 224 can include more components or fewer components than those specifically noted.

The section base 228 supports at least a portion of the user 10 (illustrated in FIG. 1) receiving the therapeutic treatment when the user 10 is positioned on the treatment device 12 (illustrated in FIG. 1). The section base 228 is generally rigid and can be made of a rigid material such as wood, aluminum, steel, plastic, or other suitable materials. In one implementation, the section base 228 is generally flat shaped. In alternative, non-exclusive embodiments, the section base 228 has a thickness of approximately 0.2, 0.3, 0.4, 0.5, 0.6, 0.7, 0.8, or 1 inches. However, other thicknesses can be utilized.

The one or more resilient layers 230 are secured to and can be positioned substantially on top of and positioned next to the section base 228. These resilient layer(s) 230 provide a cushion for the comfort of the user 10 resting on the treatment device 12. The body section 224 can include any suitable number of resilient layers 230. Further, the size, thickness, shape, and design of each resilient layer 230 can be adjusted to achieve the desired comfort of the treatment device 12.

As alternative, non-exclusive examples, the resilient layer(s) 230 can have a total thickness of approximately 1, 1.5, 2, 2.5, 3, 3.5, or 4 inches. However, other values are possible.

In the non-exclusive implementation of FIG. 2C, the body section 224 includes three resilient layers 230, namely a first resilient layer 230A, a second resilient layer 230B, and a third resilient layer 230C that are stacked on top of the section base 228. In this non-exclusive implementation, the first resilient layer 230A can be thicker than the other resilient layers 230B, 230C. For example, the first resilient layer 230A can have a thickness of approximately one inch, and other two resilient layers 230B, 230C can have a thickness approximately one-half inch each. However, other dimensions are possible. In one implementation, the first resilient layer 230A has a thickness of at least 0.5, 1, 1.5, or 2 inches; and the second resilient layer 230B has a thickness of at least 0.1, 0.25, 0.5, 0.75, or one inch.

Alternatively, the body section 224 can be designed to include more than three or fewer than three resilient layers 230. For example, the body section 224 can include only one resilient layer 230, two resilient layers 230, or four resilient layers 230.

In FIG. 2C, the third resilient layer 230C is positioned directly on the section base 228, the first resilient layer 230A is positioned directly on the third resilient layer 230C, and the second resilient layer 230B is positioned directly on the first resilient layer 230A. In this design, the first resilient layer 230A is positioned between the third resilient layer 230C and the second resilient layer 230B. It should be noted that these layers can alternatively be referred to as a top, middle, and bottom layer.

The first resilient layer 230A is configured to provide adjustable support for the user 10 of the treatment device 12. For example, as provided herein, the first resilient layer 230A can include (i) the first support region 224F, and (ii) the second support region 224S, which can be selectively deformed, such as with the actuator assembly 222, relative to the first support region 224F. In some embodiments, as illustrated, the first resilient layer 230A can include a first layer section 242 that includes at least a portion of the first support region 224F, a second layer section 244 that includes at least a portion of the second support region 224S, and a third layer section 245 positioned at an end of the body section 224, such as near where the headrest assembly 18 (illustrated in FIG. 1) would be coupled to the body section 224. In certain embodiments, the first layer section 242 has a first layer resilience, and the second layer section 244 has a second layer resilience that is different than the first layer resilience. Stated in another manner, in such embodiments, the second layer section 244 can be more flexible than the first layer section 242. With such design, the second support region 224S can be more easily deformed, i.e. with less pressure, relative to the first support region 224F. It is appreciated that the difference in layer resilience between the first layer section 242 and the second layer section 244 can be provided in any suitable manner. For example, the first layer section 242 can include materials such as foam, memory foam, fleece pads, etc., and the second layer section 244 can include gel packages, liquid filled packages, or other suitable materials in order that the second layer resilience is different than the first layer resilience. Alternatively, the first resilient layer 230A can be formed from a continuous piece of foam and/or each of the first layer section 242 and the second layer section 244 can have a layer resilience that is substantially equal to the other.

Additionally, and/or in the alternative, the first resilient layer 230A can include one or more layer reliefs 230Aa (two are illustrated with dashed lines), such as via cuts or other structural modifications made into the material that forms the first resilient layer 230A, which thereby influences the deformation of the second support region 224S relative to the first support region 224F. The design of the layer reliefs 230Aa can be tailored to achieve the desired deformation of the first resilient layer 230A. Further, the layer relief(s) 230Aa can be used in any of the embodiments disclosed herein.

As illustrated in this embodiment, the second resilient layer 230B is configured to be positioned on top of and to cover the first resilient layer 230A. Stated differently, the second resilient layer 230B is positioned between the first resilient layer 230A and the section cover 232 (illustrated in FIGS. 2A and 2B). In FIG. 2C, the second resilient layer 230B is illustrated as positioned away from the first resilient layer 230A. However, upon assembly, the second resilient layer 230B is directly in contact with the first resilient layer 230A.

The second resilient layer 230B can be formed from any suitable materials. For example, in certain non-exclusive embodiments, the second resilient layer 230B can be formed from one or more of foam, memory foam, fleece pads, etc. Additionally, in some embodiments, the second resilient layer 230B can be formed as a single continuous piece of foam or multiple pieces of foam.

In certain, non-exclusive implementations, the second resilient layer 230B is configured to not be deformed by the actuator assembly 222 as the actuator assembly 222 selectively deforms the second support region 224S of the first resilient layer 230A relative to the first support region 224F of the first resilient layer 230A. With this design, the actuator assembly 222 pulls down, deforms, and compresses the second support region 224S without deforming the second resilient layer 230B and/or the section cover 232. It should be noted that while the actuator assembly 222 has deformed the second support region 224S, a pressure or force such as from the weight of the user 10 can selectively deform the second resilient layer 230B and the section cover 232 near the second support region 224S.

As shown in FIG. 2C, in this embodiment, the third resilient layer 230C is configured to be positioned between the first resilient layer 230A and the section base 228. The third resilient layer 230C can be formed from any suitable materials. For example, in certain non-exclusive embodiments, the third resilient layer 230C can be formed from one or more of foam, memory foam, fleece pads, etc. Additionally, in some embodiments, the third resilient layer 230C can be formed as a continuous piece of foam. In various embodiments, the actuator assembly 222 is configured to selectively deform a portion of the third resilient layer 230C concurrently with the selective deformation of the second support region 224S of the first resilient layer 230A relative to the first support region 224F of the first resilient layer 230A. It is appreciated, however, that the third resilient layer 230C can be formed from different materials, and thus can be deformed to a different (lesser or greater) extent, as compared to the second support region 224S of the first resilient layer 230A.

With the present design, during use of the treatment device 12 (illustrated in FIG. 1), the actuator assembly 222 is configured to selectively deform the second support region 224S relative to the first support region 224F to enable the user 10 to be positioned comfortably and conveniently in the prone position while on the treatment device 12. Stated differently, the actuator assembly 222 is configured to selectively, directly or indirectly, pull down on and/or provide generally downward pressure on the second support region 224S of the first resilient layer 230A (and the third resilient layer 230C) to deform the second support region 224S relative to the first support region 224F and the section base 228. In many embodiments, the actuator assembly 222 is further configured to selectively deform the second support region 224S relative to and independently of the second resilient layer 230B and the section cover 232.

The design of the actuator assembly 222 can be varied to suit the requirements of the treatment device 12. In various embodiments, the actuator assembly 222 can include an engagement member 246, an actuator subassembly 248 including at least one actuator 250, one or more actuator drive components 251 (illustrated in FIG. 2E) and an actuator adapter 252 (illustrated in FIG. 2D), and a plurality of member connectors 254. Alternatively, the actuator assembly 222 can include more components or fewer components than those specifically noted herein. Still alternatively, the actuator subassembly 248 can have another suitable design, such as the actuator subassembly 248 being designed without the need for the actuator adapter 252.

It should be noted that the components of the actuator assembly 222 can be selected and positioned to achieve the desired size, shape, and/or location of the second support region 224S and the resulting changes in support.

As illustrated in the embodiment shown in FIG. 2C, the engagement member 246 is positioned adjacent to and on top of the first resilient layer 230A. Additionally, the engagement member 246 can be positioned substantially between the first resilient layer 230A and the second resilient layer 230B. The size and design of the engagement member 246 can be varied to suit the requirements of the actuator assembly 222 and the desired size and shape of the deformation of the second support region 224S. In some embodiments, the engagement member 246 can be substantially rectangle-shaped, and can be positioned substantially adjacent to the second support region 224S of the first resilient layer 230A. Alternatively, the engagement member 246 can be substantially oval-shaped to change the shape of the second support region 224S of the first resilient layer 230A. Still alternatively, the engagement member 246 can further include one or more cutouts that are formed within the overall shape of the engagement member 246. Yet alternatively, the engagement member 246 can have another suitable size and shape.

Moreover, alternatively, the engagement member 246 could include two member sections (not shown in this embodiment) separated by a flexible connector (not shown in this embodiment) that would result in two somewhat circular-shaped depressions in the first resilient layer 230A.

The engagement member 246 can be formed from any suitable materials or fabrics. For example, in one non-exclusive embodiment, the engagement member 246 is flexible, and can be formed from a felt material. Alternatively, the engagement member 246 can be formed from another suitable material or fabric. Still alternatively, the engagement member 246 can be formed from any suitable rigid material.

Figure 2D:
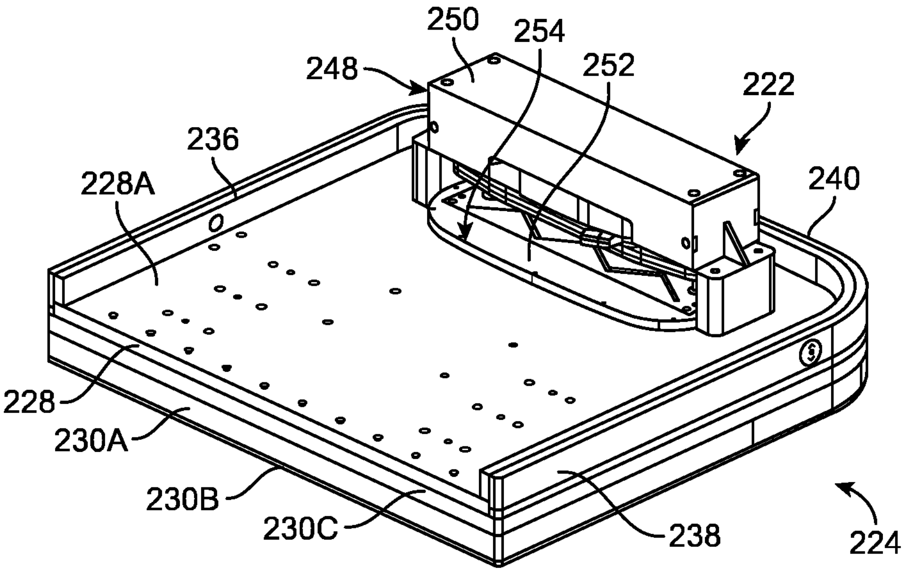
FIG. 2D is a simplified bottom perspective view illustration of a portion of the body section and the actuator assembly illustrated in FIG. 2A.

FIG. 2D is a simplified bottom perspective view illustration of a portion of the body section 224 illustrated in FIG. 2A. FIG. 2D again illustrates that the body section 224 includes the section base 228, the first resilient layer 230A, the second resilient layer 230B, the third resilient layer 230C, the first side flange 236, the second side flange 238, and the first end flange 240. The section cover 232 (illustrated in FIG. 2A) is again omitted from FIG. 2D for purposes of clarity.

FIG. 2D also illustrates certain features of the actuator assembly 222 that are not visible or are less visible in detail in FIG. 2C. For example, FIG. 2D illustrates the member connectors 254, and the actuator subassembly 248 including the at least one actuator 250 and the actuator adapter 252. The design of each of these components can be varied pursuant to the teachings provided herein.

With reference to FIGS. 2C and 2D, the member connectors 254 can be spaced apart and connect the engagement member 246 (illustrated in FIG. 2C) to the actuator adapter 252 of the actuator subassembly 248. With this design, for example, movement of the actuator adapter 252 downward (away from the section base 228), with the at least one actuator 250 in a first direction, will cause the member connectors 254 to pull the engagement member 246 downward and compress the second support region 224S (illustrated in FIG. 2B) of the first resilient layer 230A. Alternatively, movement of the actuator adapter 252 upward (towards the section base 228), with the at least one actuator 250 in a second direction that is opposite the first direction, will remove the downward force on the member connectors 254, and allow the second support region 224S of the first resilient layer 230A to relax and/or un-compress and move the engagement member 246 upward.

The at least one actuator 250 can have any suitable design for purposes of selectively actuating, and thus moving the actuator adapter 252 and deforming the second support region 224S of the first resilient layer 230A relative to the first support region 224F (illustrated in FIG. 2B) of the first resilient layer 230A. For example, the actuator 250 can be any suitable type of electrical actuator that selectively moves the actuator adapter 252. A suitable, non-exclusive, actuator 250 is a ball-screw, linear actuator. In one embodiment, the at least one actuator 250 is configured to actuate two spaced apart actuator drive components 251 (illustrated in FIG. 2E), such as linear, screw-based actuator drive components. Alternatively, the at least one actuator 250 can be a manual actuator such as a crank. Still alternatively, the at least one actuator 250 can have another suitable design.

The actuator adapter 252 can have any suitable design and can be positioned in any suitable manner. In this embodiment, the actuator adapter 252 can be a flat, rigid, oval-shaped plate, which can be positioned substantially adjacent to the bottom surface 228A of the section base 228 in the relaxed, first position 224A (illustrated in FIG. 2A) of the first resilient layer 230A. In certain embodiments, the actuator adapter 252 can be made of a rigid material such as wood, aluminum, steel, plastic, or other suitable materials. Alternatively, the actuator adapter 252 can have a different shape, be positioned in a different manner, or be formed form another suitable material. For example, in one non-exclusive alternative embodiment, the actuator adapter 252 can be positioned to fit within an aperture formed into the section base 228, such that the actuator adapter 252 is substantially flush with the section base 228 when the body section 224 is in the first (home or undeformed) position 224A.

Figure 2E:
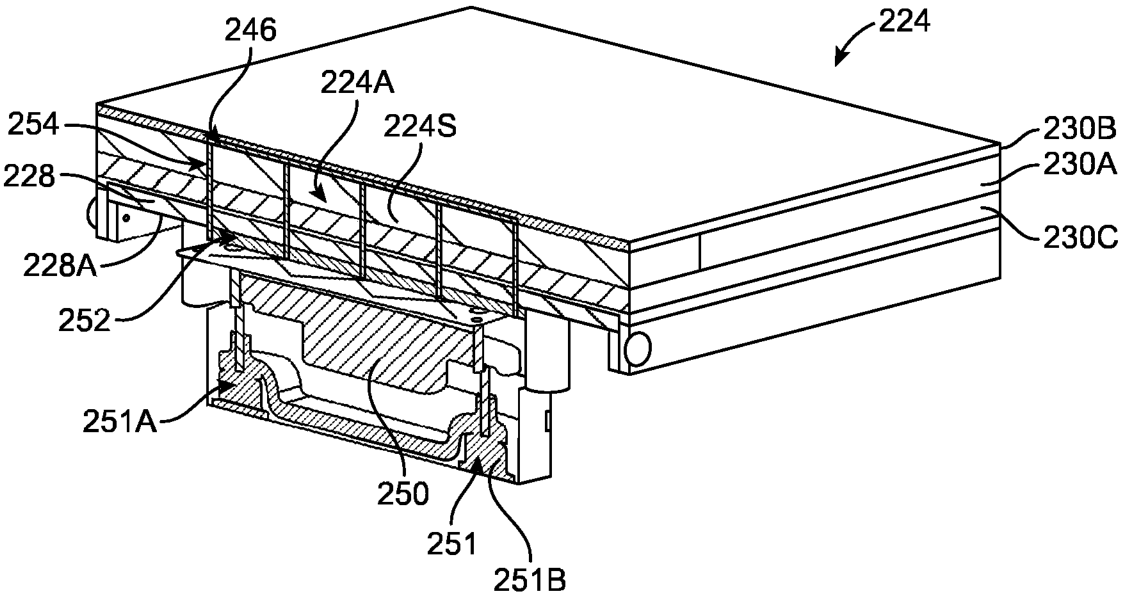
FIG. 2E is a simplified cutaway perspective view illustration of a portion of the body section and the actuator assembly illustrated in FIG. 2A.

FIG. 2E is a simplified cutaway perspective view illustration of a portion of the body section 224 illustrated in FIG. 2A, with the section cover 232 again being omitted for purposes of clarity. As shown in FIG. 2E, the at least one actuator 250 is configured to selectively actuate two spaced apart actuator drive components 251, such as a first actuator drive component 251A and a second actuator drive component 251B, that work in conjunction with one another to provide the desired force on the actuator adapter 252 and/or the engagement member 246. In certain embodiments, each of the actuator drive components 251A, 251B can be linear, screw-based actuator drive components 251A, 251B. Alternatively, the actuator drive components 251A, 251B can have another suitable design and/or can operate in another suitable manner when actuated by the at least one actuator 250.

Additionally, in FIG. 2E, the at least one actuator 250 has actuated the actuator drive components 251A, 251B so as to position the actuator adapter 252 adjacent to the bottom surface 228A of the section base 228. At this time, the at least one actuator 250 is not pulling the member connectors 254 and the engagement member 246 downward. As a result thereof, the second support region 224S of the first resilient layer 230A is not compressed and the second support region 224S is at the un-compressed first position 224A. The second and third resilient layers 230B, 230C are also shown in FIG. 2E.

In the present design, the member connectors 254 can be spaced apart and connect and couple the engagement member 246 (illustrated in FIG. 2C) to the actuator adapter 252 of the actuator subassembly 248. In this design, each member connector 254 extends through a separate aperture in the first resilient layer 230A, the third resilient layer 230C, and the section base 228.

Figure 2F:
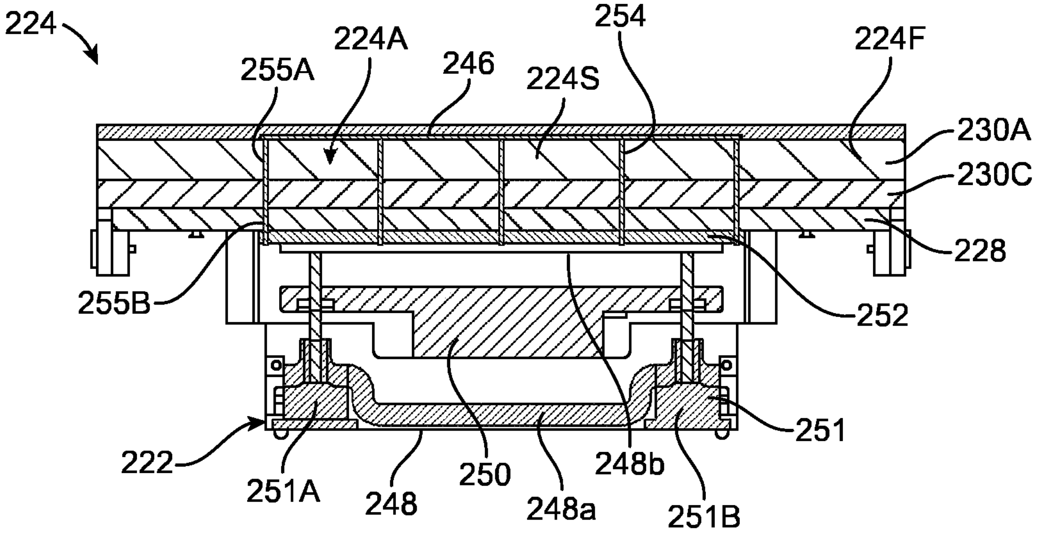
FIG. 2F is a simplified cutaway side view illustration of a portion of the body section and the actuator assembly illustrated in FIG. 2A.

FIG. 2F is a simplified end, cross-sectional view of the body section 224 illustrated in FIG. 2E. As illustrated in FIG. 2F, the actuator(s) 250 is coupled to the actuator adapter 252 via the actuator drive components 251A, 251B such that linear movement of the actuator drive components 251A, 251B when actuated by the actuator 250 results in a corresponding linear movement of the actuator adapter 252 (up and down in FIG. 2F). Additionally, the plurality of member connectors 254 are fixedly connected to and extend between the engagement member 246 and the actuator adapter 252. In the non-exclusive implementation of FIG. 2F, in order to effectively extend between the engagement member 246 and the actuator adapter 252, the plurality of member connectors 254 are also configured to extend through the section base 228, the third resilient layer 230C and the first resilient layer 230A (such as via small access apertures formed into each of the section base 228, the third resilient layer 230C and the first resilient layer 230A). Stated in another fashion, in one implementation, each member connector 254 extends through (i) a separate, small, layer aperture 255A in the first and third resilient layers 230A, 230C; and (i) a separate, small, base aperture 255B in the section base 228.

The actuator assembly 222 can include any suitable number of member connectors 254 and/or the member connectors 254 can have any suitable design and be made from any suitable materials. For example, in one non-exclusive alternative embodiment, the actuator assembly 222 can include ten member connectors 254 that are each formed as thin, flexible, wire-like cords or cables. In this design, each member connector 254 is rigid when in tension, but flexes when compressed. Alternatively, one or more of the member connectors 254 can be rigid or resilient. Still alternatively, the member connectors 254 can have another suitable design.

Additionally, in certain embodiments, in order to more effectively modify the desired deformation profile, one or more of the member connectors 254 can have a different resilience, such as with the member connectors 254 toward the middle of the second support region 224S tending to stretch more (or less) easily than the member connectors 254 toward the edges of the second support region 224S. Further, or in the alternative, in some embodiments, one or more of the member connectors 254 can be of different lengths so as to more effectively define the desired deformation profile of the second support region.

As provided herein, the actuator assembly 222 can include greater than ten or fewer than ten member connectors 254. It should be noted that the positioning, number, and design of the member connectors 254 can be adjusted to adjust the shape and other characteristics of the second support region 224S when compressed in the second position 224B (illustrated in FIG. 2B). It should be noted that each of the member connectors 254 can be the same or different to adjust the compression characteristics of second support region 224S. For example, in certain embodiments, as noted, one or more of the member connectors 254 can be longer (or shorter) or slightly more (or less) resilient than the other member connectors 254 to tune the shape of the second support region 224S, i.e., to modify the desired deformation profile.

Thus, during use of the actuator assembly 222 to selectively deform the second support region 224S relative to the first support region 224F of the first resilient layer 230A, the at least one actuator 250 actuates the actuator drive components 251A, 251B to move linearly and/or to provide a linear force in a generally downward direction, which, in turn, moves the actuator adapter 252 linearly in a generally downward direction. Due to the presence of the plurality of member connectors 254 that extend between the actuator adapter 252 and the engagement member 246, the downward force on the actuator adapter 254 pulls downward on the engagement member 246, which thus deforms the second support region 224S of the first resilient layer 230A relative to the first support region 224F of the first resilient layer 230A. More specifically, in the embodiment shown in FIGS. 2A-2F, with the section base 228 being a full plate-shaped base, other than the small access base apertures 255B formed into the section base 228 to allow the member connectors 254 to pass therethrough, the second support region 224S of the first resilient layer 230A, as well as a portion of the third resilient layer 230C which may be deformed to a different (lesser or greater) extent, are deformed due to compression relative to the rigid, stationary, section base 228.

In an alternative design, each member connector 254 can be independently moved by separate actuator (not shown in FIG. 2F) to specifically tune the shape and profile of the second support region 224S to suit the needs of the patient.

As noted above, the treatment device 12 can include an assembly controller 234 (illustrated in FIG. 2A) that is configured to control operation of the actuator assembly 222. In particular, the assembly controller 234 is configured to control the actuator assembly 222 to selectively deform the second support region 224S of the first resilient layer 230A relative to the first support region 224F of the first resilient layer 230A.

It is appreciated that the deformation of the second support region 224S relative to the first support region 224F between the first (home or undeformed) position 224A and the second (deformed) position 224B, under control of the assembly controller 234 that controls the actuator assembly 222, can in actuality be anywhere along a continuum between the first (home or undeformed) position and the second (deformed) position. The determination of the proper positioning and/or deformation of the second support region 224S relative to the first support region 224F can be based, at least in part, on the desired comfort level for the user 10 (illustrated in FIG. 1) of the treatment device 12.

It should be noted that with the design of FIG. 2F, when the second support region 224S is deformed, the actuator assembly 222 has deformed (e.g., pulled down) a portion of the first resilient layer 230A, and possibly a portion of the third resilient layer 230C (depending upon the level of actuation). At this time, (i) the first resilient layer 230A is pulled away (separated) from the second resilient layer 230B in the area of the second support region 224S; and (ii) the second resilient layer 230B and the cover 232 (illustrated in FIG. 2B) in the area of the second support region 224S are no longer supported. As a result thereof, (i) the user 10 (illustrated in FIG. 1) can more easily deform the second resilient layer 230B and the cover 232 in the area of the second support region 224S than the first support region 224F; and (ii) the second resilient layer 230B and the cover 232 still provide some support (resistance) in the second support region 224S. Thus, this unique design allows for the second support region 224S to better conform to the shape of the user 10 in this area, while also providing support in this area. Further, the actuator assembly 222 can be controlled to selectively adjust the level of support for the user 10 in the second support region 224S.

In the non-exclusive implementation of FIG. 2F, the actuator subassembly 248 can further include (i) an actuator frame 248A that fixedly secures the at least one actuator 250 and/or the actuator drive components 251A, 251B to the section base 228 or another structure; and (ii) an actuator intermediate mount 248B that connects the actuator(s) 250 and/or the actuator drive components 251A, 251B to the actuator adapter 252.

Figure 3A:
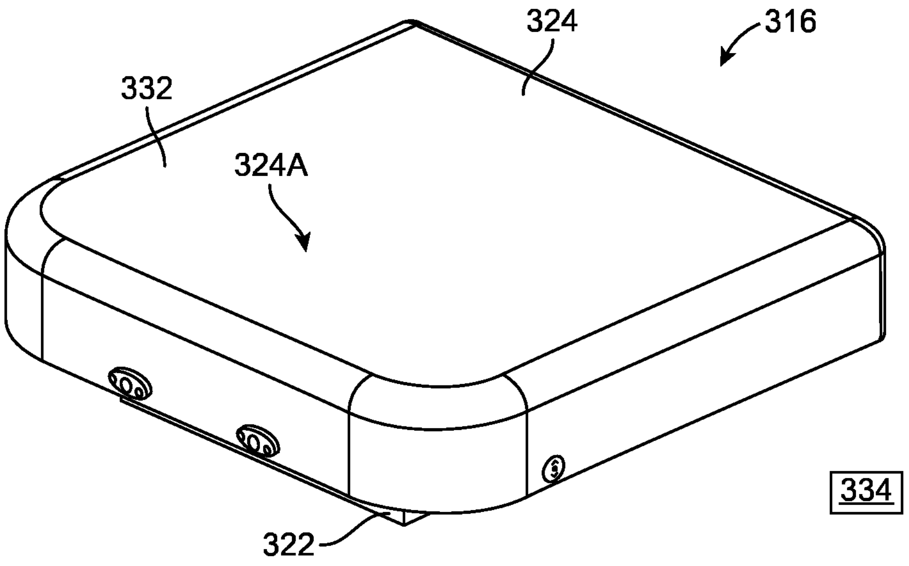
FIG. 3A is a simplified perspective view illustration of another embodiment of a body section of the device body that can be included as part of the treatment device illustrated in FIG. 1, the body section being shown in a first (home) position, and another embodiment of an actuator assembly that is configured to selectively deform a portion of the body section.

FIG. 3A is a simplified perspective view illustration of another embodiment of a body section 324 of the device body 316, such as the first body section 24X shown in FIG. 1, that can be included as part of the treatment device 12 illustrated in FIG. 1. Additionally, FIG. 3A illustrates another embodiment of an actuator assembly 322 that can be included as part of the treatment device 12.

The body section 324 is adapted to support at least a portion of the user 10 (illustrated in FIG. 1) when the user 10 is positioned on the device body 316 for purposes of receiving a therapeutic treatment. In FIG. 3A, the body section 324 is shown in a first (home or undeformed) position 324A.

The body section 324 illustrated in FIG. 3A is substantially similar to the body section 224 illustrated and described in relation to FIG. 2A. However, in this embodiment, there have been some minor modifications to the structure of the body section 324, and some corresponding minor modifications to the operation of the actuator assembly 322 based on such structural modifications.

In various embodiments, the body section 324 again includes a rigid, section base 328 (illustrated, for example, in FIG. 3C), at least one resilient layer 330 (illustrated, for example, in FIG. 3C) that is positioned on top of the section base 328, and a section cover 332 that covers the at least one resilient layer 330 and secures the at least one resilient layer 330 to the section base 328. The section cover 332 is adapted to engage the user 10 when the user 10 is positioned on top of the treatment device 12.

The actuator assembly 322 is operatively coupled to the body section 324 for purposes of deforming a portion or support region of the at least one resilient layer 330 of the body section 324. However, regardless of whether the body section 324 is in the first (home or undeformed) position 324A, or in a second (deformed) position 324B, such as shown in FIG. 3B, the section cover 332 does not naturally deform without the user 10 being positioned thereon.

FIG. 3A further illustrates an assembly controller 334 that is configured to control operation of the actuator assembly 322. In particular, the assembly controller 334 is configured to control the actuator assembly 322 to selectively deform one or more regions of the at least one resilient layer 330 relative to other regions of the at least one resilient layer 330.

Figure 3B:
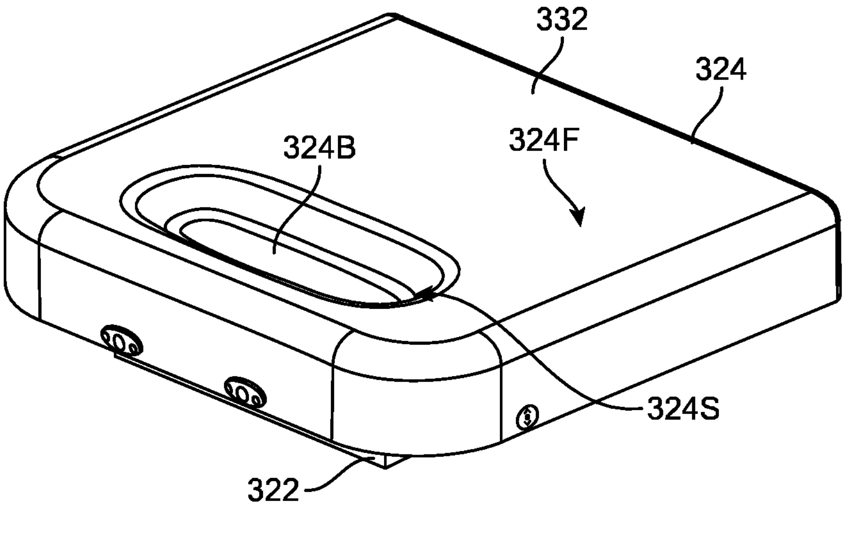
FIG. 3B is a simplified perspective view illustration of a portion of the body section and the actuator assembly illustrated in FIG. 3A, the body section being shown in a second (deformed) position.

FIG. 3B is a simplified perspective view illustration of the body section 324 illustrated in FIG. 3A. As illustrated in FIG. 3B, the body section 324 is shown in a second (deformed) position 324B. More particularly, FIG. 3B illustrates what the body section 324 would look like with the body section 324 in the second (deformed) position 324B and with a force (such as from the breasts of the user 10 (illustrated in FIG. 1)) pushing down on the section cover 332.

As shown in FIG. 3B, the second support region 324S has been deformed relative to the first support region 324F. During use of the treatment device 12 (illustrated in FIG. 1), the actuator assembly 322 is again configured to selectively deform the second support region 324S relative to the first support region 324F to enable the user 10 (illustrated in FIG. 1) to be positioned comfortably and conveniently in the prone position while on the treatment device 12. For example, in certain embodiments, the actuator assembly 322 is configured to selectively, directly or indirectly, pull down on and/or provide generally downward pressure on the second support region 324S to deform the second support region 324S relative to the first support region 324F.

Substantially similar to the previous embodiments, the size and shape of the second support region 324S and the specific location of the second support region 324S can be varied depending on the size and shape of the user 10, and the area and/or body parts of the user 10 that are being adjustably supported within the second support region 324S. For example, the second support region 324S can have a particular size, shape and positioning so as to effectively align with and adjustably support the breasts and/or the stomach of the user 10 of the treatment device 12.

Figure 3C:
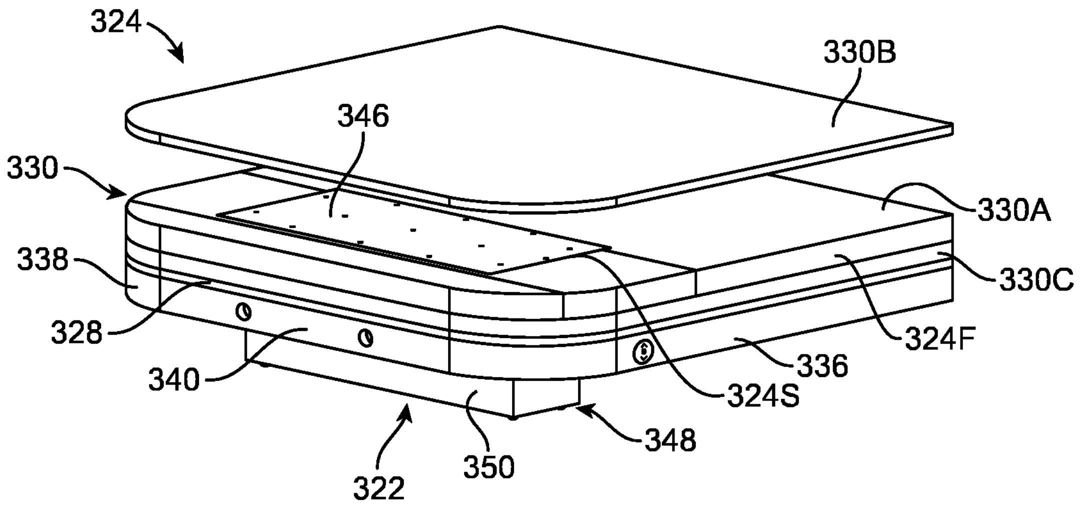
FIG. 3C is a partially exploded top perspective view illustration of a portion of the body section and the actuator assembly illustrated in FIG. 3A.

FIG. 3C is a partially exploded top perspective view illustration of a portion of the body section 324 illustrated in FIG. 3A, with the section cover 332 (illustrated in FIG. 3A) being omitted for purposes of clarity. Additionally, FIG. 3C also illustrates certain details of the actuator assembly 322.

In this embodiment, the body section 324 again includes the rigid, section base 328, the at least one resilient layer 330, and the section cover 332 that are substantially similar to the corresponding components in the previous embodiments. As also shown in FIG. 3C, the body section 324 again further includes a first side flange 336, a second side flange 338, and a first end flange 340 that are substantially similar to the corresponding components illustrated and described in detail herein above. Accordingly, not all aspects of the body section 324 will be described again in detail.

The section base 328 supports at least a portion of the user 10 (illustrated in FIG. 1) receiving the therapeutic treatment when the user 10 is positioned on the treatment device 12 (illustrated in FIG. 1). The section base 328 is generally rigid and can again be made of a rigid material such as wood, aluminum, steel, plastic, or other suitable materials.

The at least one resilient layer 330 is secured to and can be positioned substantially on top of the section base 328. In this embodiment, the body section 324 again includes a first resilient layer 330A, a second resilient layer 330B, and a third resilient layer 330C.

The first resilient layer 330A is configured to provide adjustable support for the user 10 of the treatment device 12. For example, the first resilient layer 330A can include the first support region 324F and the second support region 324S, which can be selectively deformed, e.g., with the actuator assembly 322, relative to the first support region 324F. The structure and functionality of the first resilient layer 330A can be substantially identical to what has been described in detail herein above. Accordingly, such structure and detail will not be repeated herein.

The second resilient layer 330B is configured to be positioned on top of and to cover the first resilient layer 330A. Stated in another manner, the second resilient layer 330B is positioned between the first resilient layer 330A and the section cover 332. As with the previous embodiments, the second resilient layer 330B is again configured to not be deformed by the actuator assembly 322 as the actuator assembly 322 selectively deforms the second support region 324S of the first resilient layer 330A relative to the first support region 324F of the first resilient layer 330A.

The third resilient layer 330C is configured to be positioned between the first resilient layer 330A and the section base 328. As above, in various embodiments, the actuator assembly 322 is configured to selectively deform a portion of the third resilient layer 330C concurrently with the selective deformation of the second support region 324S of the first resilient layer 330A relative to the first support region 324F of the first resilient layer 330A. However, the third resilient layer 330C can again be formed from different materials, and thus can be deformed to a different (lesser or greater) extent, as compared to the second support region 324S of the first resilient layer 330A.

The first side flange 336, the second side flange 338 and the first end flange 340 are each positioned adjacent to a bottom surface 328A (illustrated in FIG. 3D) of the section base 328, and extend in a generally downward direction away from the section base 328. The flanges 336, 338, 340 again provide additional structural support within the body section 324, and also help to provide certain protection for portions of the actuator assembly 322, which are also positioned near and/or adjacent to the bottom surface 328A of the section base 328.

The actuator assembly 322 is again configured to selectively deform the second support region 324S of the first resilient layer 330A relative to the first support region 324F of the first resilient layer 330A. The actuator assembly 322 is also configured to selectively deform the second support region 324S relative to the section base 328. In many embodiments, the actuator assembly 322 is further configured to selectively deform the second support region 324S relative to and independently of the second resilient layer 330B and the section cover 332.

Figure 3D:
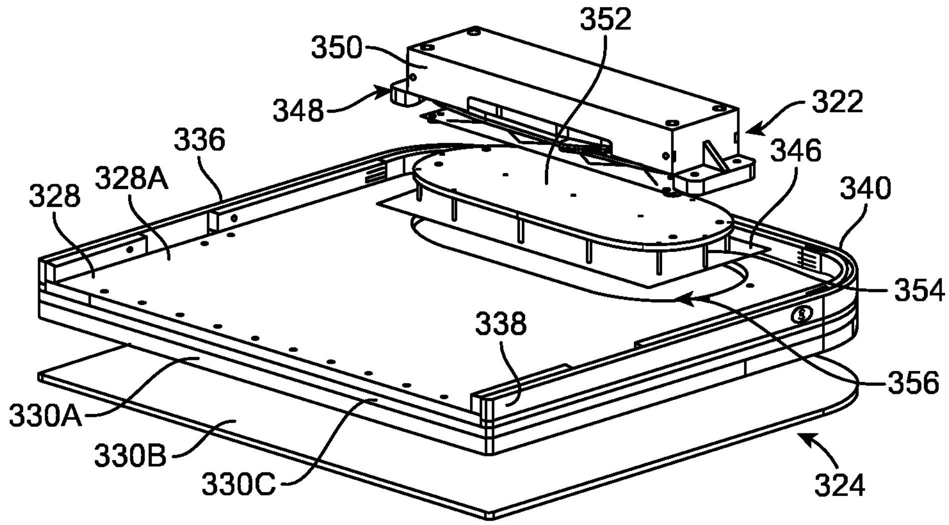
FIG. 3D is a partially exploded bottom perspective view illustration of a portion of the body section and the actuator assembly illustrated in FIG. 3A.
Figure 3E:
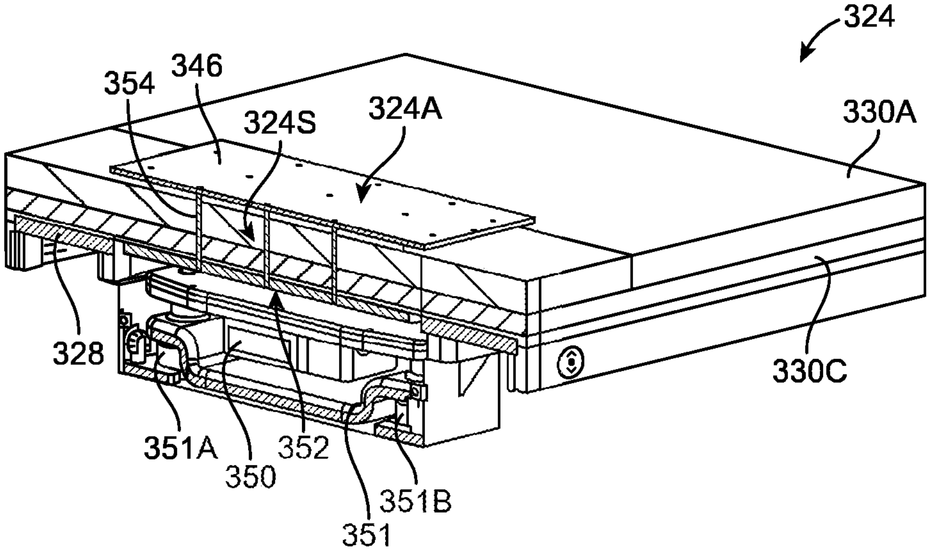
FIG. 3E is a simplified cutaway perspective view illustration of a portion of the body section and the actuator assembly illustrated in FIG. 3A.
Figure 3F:
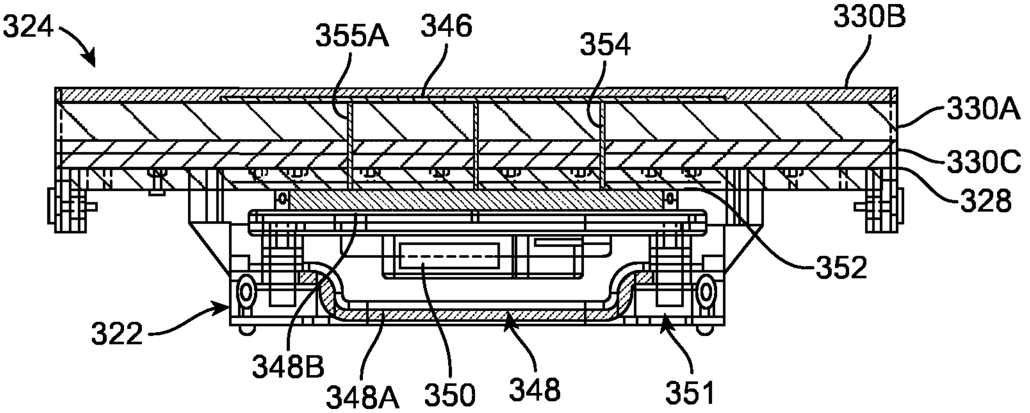
FIG. 3F is a simplified cutaway side view illustration of a portion of the body section and the actuator assembly illustrated in FIG. 3A.

In this embodiment, the actuator assembly 322 again includes an engagement member 346, an actuator subassembly 348 including at least one actuator 350, one or more actuator drive components 351 (illustrated in FIG. 3E) and an actuator adapter 352 (illustrated in FIG. 3D), and a plurality of member connectors 354 (illustrated in FIG. 3F). As illustrated, the engagement member 346 is positioned adjacent to and on top of the first resilient layer 330A. Additionally, the engagement member 346 is positioned substantially between the first resilient layer 330A and the second resilient layer 330B. The design, shape, size and materials utilized for the engagement member 346 can be varied in a manner substantially similar to the embodiments described herein above. Accordingly, various possibilities for the design, shape, size and materials utilized for the engagement member 346 will not be described again in detail.

FIG. 3D is a partially exploded bottom perspective view illustration of a portion of the body section 324 illustrated in FIG. 3A, with the section cover 332 (illustrated in FIG. 3A) again being omitted for purposes of clarity. FIG. 3D again illustrates that the body section 324 includes the section base 328, the first resilient layer 330A, the second resilient layer 330B, the third resilient layer 330C, the first side flange 336, the second side flange 338, and the first end flange 340.

FIG. 3D also illustrates certain features of the actuator assembly 322 that are not visible or are less visible in detail in FIG. 3C. For example, FIG. 3D illustrates the actuator assembly 322 positioned away from the section base 328.

FIG. 3D illustrates the actuator subassembly 348 including the at least one actuator 350 and the actuator adapter 352. The at least one actuator 350 can again be any suitable type of linear actuator for purposes of selectively actuating the one or more actuator drive components 351 (illustrated in FIG. 3E) to selectively deform the second support region 324S (illustrated in FIG. 3B) of the first resilient layer 330A relative to the first support region 324F (illustrated in FIG. 3B) of the first resilient layer 330A. With such design, the at least one actuator 350 can selectively actuate the one or more actuator drive components 351 to generate a linear force to selectively pull down on the engagement member 346 (illustrated in FIG. 3C), such as via the actuator adapter 352 and the plurality of member connectors 354.

In this embodiment, the actuator adapter 352 can again be a flat, rigid, oval-shaped plate, which can be positioned substantially adjacent to the bottom surface 328A of the section base 328. Alternatively, the actuator adapter 352 can have another suitable shape. In certain embodiments, the actuator adapter 352 can be made of a rigid material such as wood, aluminum, steel, plastic, or other suitable materials.

However, in the embodiment illustrated in FIG. 3D, the section base 328 includes a base aperture 356 that can correspond to the size and shape of the actuator adapter 352 of the actuator subassembly 348. With such design, the actuator adapter 352 can be positioned to fit within the base aperture 356 formed into the section base 328, such that the actuator adapter 352 is substantially flush with the section base 328 when the body section 324 is in the first (home or undeformed) position 324A.

Additionally, as the actuator assembly 322 is utilized for selectively deforming the second support region 324S of the first resilient layer 330A relative to the first support region 324F, at least a portion of the third resilient layer 330C (and maybe even a portion of the second support region 324S of the first resilient layer 330A depending on the extent of the deformation) can also be deformed in a manner so as to extend at least in part through the base aperture 356.

It should be noted that in FIG. 3D, for clarity, the member connectors 354 are illustrated outside of the first and third resilient layers 330A, 330C, and the engagement member 346 is illustrated outside of its position between the second and first resilient layers 330B, 330A.

FIG. 3E is a simplified cutaway perspective view illustration of the body section 324 illustrated in FIG. 3A, without the section cover 332 and the second resilient layer 330B. In FIG. 3E, the actuator(s) 350 via the one or more actuator drive components 351, such as a first actuator drive component 351A and a second actuator drive component 351B, has positioned the actuator adapter 352 within the section base 328. At this time, the actuator(s) 350 and/or the actuator drive components 351A, 351B are not pulling the member connectors 354 and the engagement member 346 downward. As a result thereof, the second support region 324S of the first resilient layer 330A is not compressed and the second support region 324S is at the un-compressed first position 324A. The third resilient layer 330C is also shown in FIG. 3E.

FIG. 3F is a simplified cutaway side view illustration of the body section 324 illustrated in FIG. 3A. Additionally, FIG. 3F illustrates various features of the actuator assembly 322.

As illustrated in FIG. 3F, the at least one actuator 350 is coupled to the actuator adapter 352 via the one or more actuator drive components 351 such that linear movement of the actuator drive components 351 as actuated by the actuator(s) 350 results in a corresponding linear movement of the actuator adapter 352. Additionally, the plurality of member connectors 354 are fixedly connected to and extend between the engagement member 346 and the actuator adapter 352. As shown, in order to effectively extend between the engagement member 346 and the actuator adapter 352, the plurality of member connectors 354 are also configured to extend through the third resilient layer 330C and the first resilient layer 330A (e.g., via small access apertures formed into each of the third resilient layer 330C and the first resilient layer 330A). Stated in another fashion, in one implementation, each member connector 354 extends through a separate, small, layer aperture 355A in the first and third resilient layers 330A, 330C.

The actuator assembly 322 can again include any suitable number of member connectors 354 and/or the member connectors 354 can have any suitable design and be made from any suitable materials. For example, in one non-exclusive alternative embodiment, the actuator assembly 322 can include ten member connectors 354 that are each formed as thin, flexible, wire-like cords or cables. Alternatively, the actuator assembly 322 can include greater than ten or fewer than ten member connectors 354. Still alternatively, the member connectors 354 can have another suitable design.

Thus, during use of the actuator assembly 322 to selectively deform the second support region 324S (illustrated in FIG. 3B) relative to the first support region 324F (illustrated in FIG. 3B) of the first resilient layer 330A, the actuator 350 actuates the one or more actuator drive components 351 to move linearly and/or provide a linear force in a generally downward direction, which, in turn, moves the actuator adapter 352 linearly in a generally downward direction. Due to the presence of the plurality of member connectors 354 that extend between the actuator adapter 352 and the engagement member 346, the downward force on the actuator adapter 354 pulls downward on the engagement member 346, which thus deforms the second support region 324S of the first resilient layer 330A relative to the first support region 324F of the first resilient layer 330A and the second resilient layer 330B. More specifically, in the embodiment shown in FIGS. 3A-3F, with the section base 328 including the base aperture 356 (illustrated in FIG. 3D), a portion of the second support region 324S of the first resilient layer 330A, as well as a portion of the third resilient layer 330C which may be deformed to a different (lesser or greater) extent, are deformed and may extend through the base aperture 356 in addition to any deformation due to compression relative to the rigid, stationary, section base 328.

Additionally, in the non-exclusive implementation of FIG. 3F, the actuator subassembly 348 can further include (i) an actuator frame 348A that fixedly secures the at least one actuator 350 and/or the actuator drive components 351 to the section base 328 or another structure; and (ii) an actuator intermediate mount 348B that connects the actuator(s) 350 and/or the actuator drive components 351 to the actuator adapter 352.

Figure 3G:
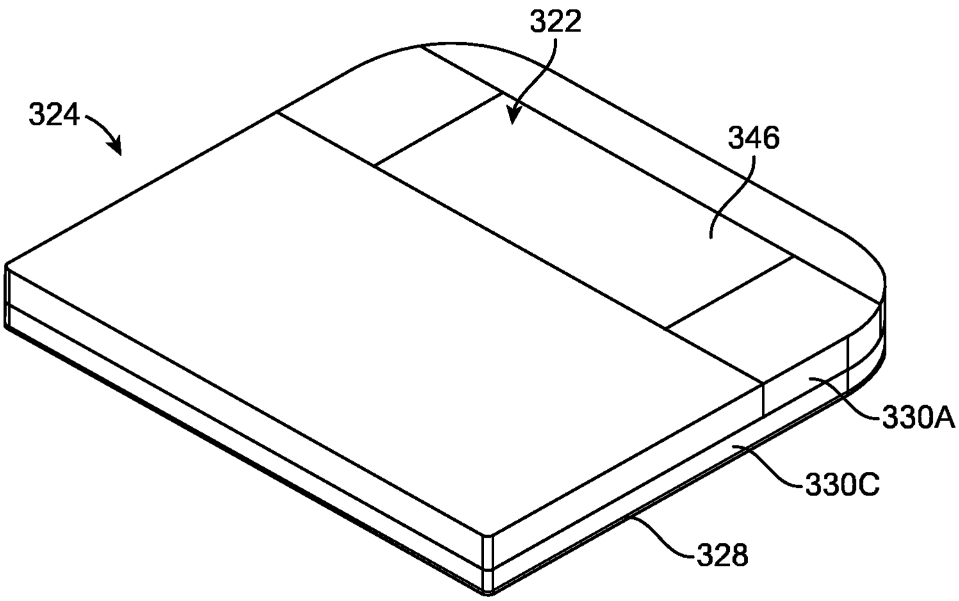
FIG. 3G is a simplified top perspective view illustration of a portion of the body section and the actuator assembly illustrated in FIG. 3A.

FIG. 3G is a simplified top perspective view illustration of a portion of the body section 324 illustrated in FIG. 3A. In particular, FIG. 3G provides another perspective view illustration of the section base 328, the first resilient layer 330A and the third resilient layer 330C of the body section 324. Additionally, FIG. 3G also illustrates the engagement member 346 that forms a portion of the actuator assembly 322.

Figure 3H:
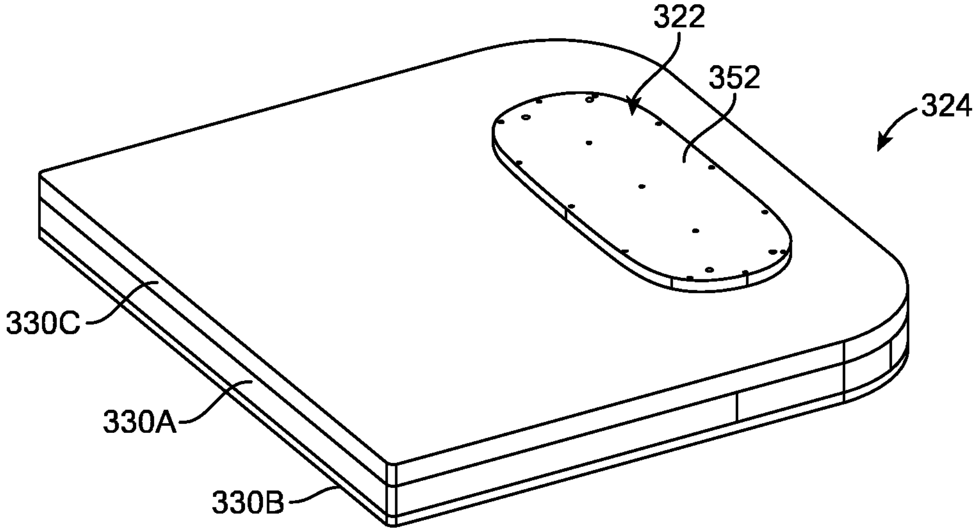
FIG. 3H is a simplified bottom perspective view illustration of another portion of the body section and the actuator assembly illustrated in FIG. 3A.

FIG. 3H is a simplified bottom perspective view illustration of another portion of the body section 324 illustrated in FIG. 3A. In particular, FIG. 3H provides a bottom perspective view of the first resilient layer 330A, the second resilient layer 330B and the third resilient layer 330C of the body section 324. Additionally, FIG. 3H also illustrates the actuator adapter 352 that forms a portion of the actuator assembly 322.

Figure 3I:
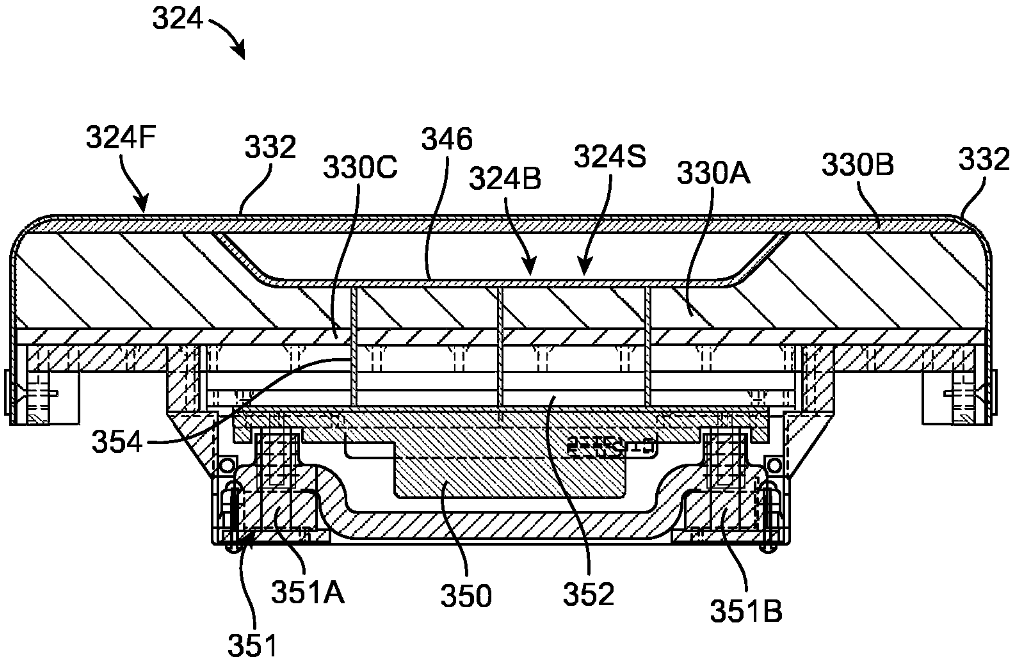
FIG. 3I is a simplified cutaway side view illustration of the body section and the actuator assembly illustrated in FIG. 3A, the body section being shown in the second (deformed) position.

FIG. 3I is a simplified cutaway side view illustration of the body section 324 illustrated in FIG. 3A, the body section 324 being shown in the second (deformed) position 324B. In particular, in this simplified drawing, the actuator adapter 352 has been pulled in a generally downward direction by the actuator(s) 350 having actuated the one or more actuator drive components 351, i.e. the first actuator drive component 351A and the second actuator drive component 351B. Through the member connectors 354 that connect the actuator adapter 352 to the engagement member 346, the engagement member 346 is also pulled in a generally downward direction. As shown, the movement of the engagement member 346 in the generally downward direction causes the second support region 324S of the first resilient layer 330A to be deformed relative to the first support region 324F. With such deformation of the second support region 324S of the first resilient layer 330A, it is appreciated that the third resilient layer 330C will also move and/or be deformed in a generally downward direction, but the second resilient layer 330B and the section cover 332 will not be correspondingly deformed, without an additional downward force on the body section 324 such as the breasts of the user 10 (illustrated in FIG. 1). Thus, this unique design allows for the second support region 324S to better conform to the shape of the user 10 in this area, while also providing support in this area. Further, the actuator assembly 322 can be controlled to selectively adjust the level of support for the user 10 in the second support region 324S.

It is appreciated that if the member connectors 354 are rigid such that they do not stretch, the movement or deformation of the second support region 324S should be approximately equal to the movement of the actuator adapter 352 in the generally downward direction. Alternatively, in embodiments where the member connectors 354 are resilient, and do stretch, then the actuator adapter 352 would typically move generally downward a little bit more than the movement or deformation of the second support region 324S relative to the first support region 324F.

Figure 4A:
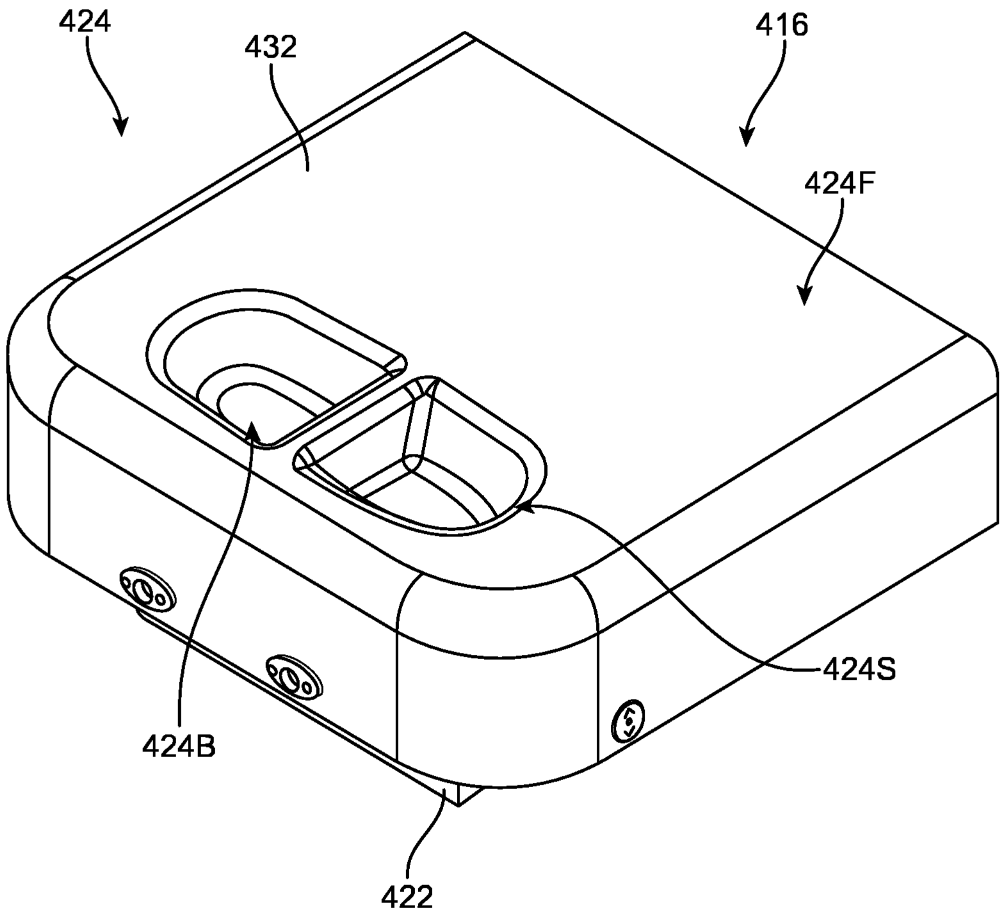
FIG. 4A is a simplified perspective view illustration of still another embodiment of a body section of the device body that can be included as part of the treatment device illustrated in FIG. 1, the body section being shown in a second (deformed) position, and still another embodiment of an actuator assembly that is configured to selectively deform a portion of the body section.

FIG. 4A is a simplified perspective view illustration of still another embodiment of a body section 424 of the device body 416 that can be included as part of the treatment device 12 illustrated in FIG. 1. Additionally, FIG. 4A again illustrates an actuator assembly 422 that can be included as part of the treatment device 12.

As with the previous embodiments, the body section 424 is adapted to support at least a portion of the user 10 (illustrated in FIG. 1) when the user 10 is positioned on the device body 416 for purposes of receiving a therapeutic treatment. As illustrated in FIG. 4A, the body section 424 is shown in a second (deformed) position 424B.

The body section 424 illustrated in FIG. 4A is substantially similar to the embodiments of the body section 224, 324 illustrated and described herein above. However, in this embodiment, there have been some modifications to the structure of the body section 424, and some corresponding modifications to the operation of the actuator assembly 422 based on such structural modifications.

In various embodiments, the body section 424 again includes a rigid, section base 428 (illustrated, for example, in FIG. 4B), at least one resilient layer 430 (illustrated in FIG. 4B) that is positioned on top of the section base 428, and a section cover 432 that covers the at least one resilient layer 430 and secures the at least one resilient layer 430 to the section base 428. The section cover 432 is adapted to engage the user 10 when the user 10 is positioned on top of the treatment device 12.

Figure 4B:
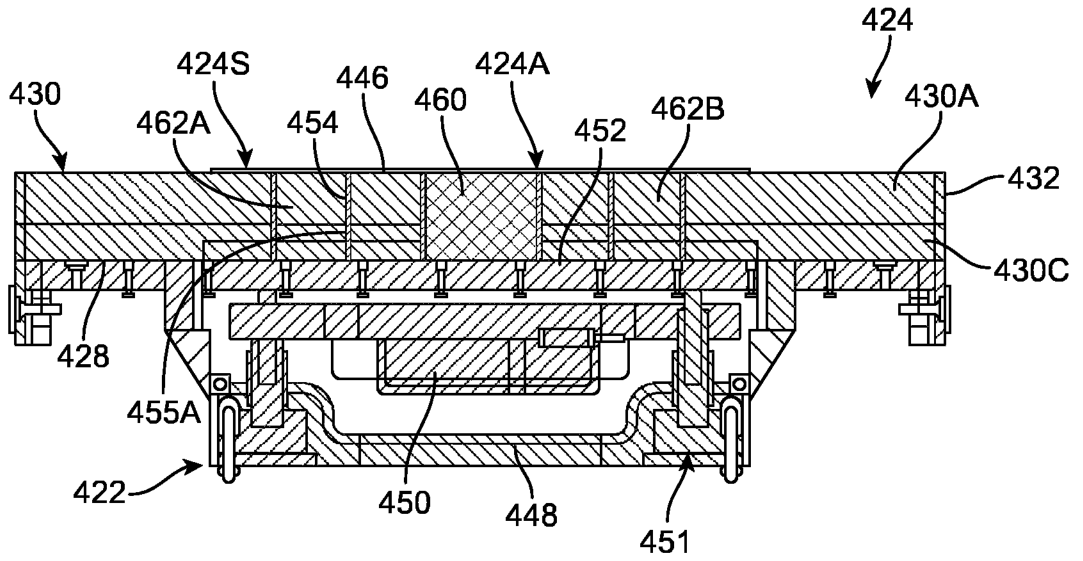
FIG. 4B is a simplified cutaway side view illustration of the body section and the actuator assembly illustrated in FIG. 4A, the body section being shown in a first (home) position.

The actuator assembly 422 is operatively coupled to the body section 424 for purposes of deforming a portion or support region of the at least one resilient layer 430 of the body section 424. However, regardless of whether the body section 424 is in a first (home or undeformed) position 424A, such as shown in FIG. 4B, or in the second (deformed) position 424B, as shown in FIG. 4A, in certain non-exclusive designs, the section cover 432 does not naturally deform without the user 10 being positioned thereon. It is appreciated that deformation of the section cover 432 is shown in FIG. 4A so that the deformation profile is easily visible.

During use of the treatment device 12, the actuator assembly 422 is again configured to selectively deform the second support region 424S relative to the first support region 424F to enable the user 10 to be positioned comfortably and conveniently in the prone position while on the treatment device 12. For example, in certain embodiments, the actuator assembly 422 is again configured to selectively, directly or indirectly, pull down on and/or provide generally downward pressure on the second support region 424S of the first resilient layer 430A (illustrated in FIG. 4B) to deform the second support region 424S relative to the first support region 424F.

However, in the embodiment shown in FIG. 4A, the size and shape (or deformation profile) of the second support region 424S is somewhat different than in the previous embodiments. In particular, as shown in this embodiment, the deformation profile of the second support region 424S includes two semi-oval-shaped depressions that are spaced apart from one another. With such design, one breast of the user 10 can fit and be comfortably supported within each of the separate depressions formed within the second support region 424S.

FIG. 4B is a simplified cutaway side view illustration of a portion of the body section 424 illustrated in FIG. 4A, the body section 424 being shown in a first (home) position 424A. In particular, FIG. 4B illustrates at least the first resilient layer 430A, the third resilient layer 430C, the section base 428 of the body section 424, and a portion of the section cover 432. Additionally, FIG. 4B illustrates various features of the actuator assembly 422.

As illustrated in FIG. 4B, the actuator assembly 422 again includes an engagement member 446, an actuator subassembly 448 including at least one actuator 450, one or more actuator drive components 451 and an actuator adapter 452, and a plurality of member connectors 454. As shown, the at least one actuator 450 is again coupled to the actuator adapter 452 via the one or more actuator drive components 451 such that linear movement of one or more actuator drive components 451 due to actuation of the actuator(s) 450 results in a corresponding linear movement of the actuator adapter 452. Additionally, the plurality of member connectors 454 are fixedly connected to and extend between the engagement member 446 and the actuator adapter 452. As shown, in order to effectively extend between the engagement member 446 and the actuator adapter 452, the plurality of member connectors 454 are also configured to extend through the third resilient layer 430C and the first resilient layer 430A (e.g., via small access apertures formed into each of the third resilient layer 430C and the first resilient layer 430A). Stated in another fashion, in one implementation, each member connector 454 extends through (i) a separate, small, layer aperture 455A in the first and third resilient layers 430A, 430C.

The actuator assembly 422 can again include any suitable number of member connectors 454 and/or the member connectors 454 can have any suitable design and be made from any suitable materials in order to effectively define the desired deformation profile. For example, in one non-exclusive alternative embodiment, the actuator assembly 422 can include ten member connectors 454 that are each formed as thin, flexible, wire-like cords or cables, with five member connectors 454 used to define each semi-oval-shaped portion of the deformation profile. Alternatively, the actuator assembly 422 can include greater than ten or fewer than ten member connectors 454. Still alternatively, the member connectors 454 can have another suitable design.

FIG. 4B further illustrates that in this embodiment, the body section 424 can further include a support pad 460 (also sometimes identified as a "sternum pad" that is positioned between a first deformation region 462A and a spaced apart second deformation region 462B of the second support region 424S. In certain embodiments, the support pad 460 can be configured to support a sternum of the user 10 (illustrated in FIG. 1) between the breasts of the user 10.

Figure 4C:
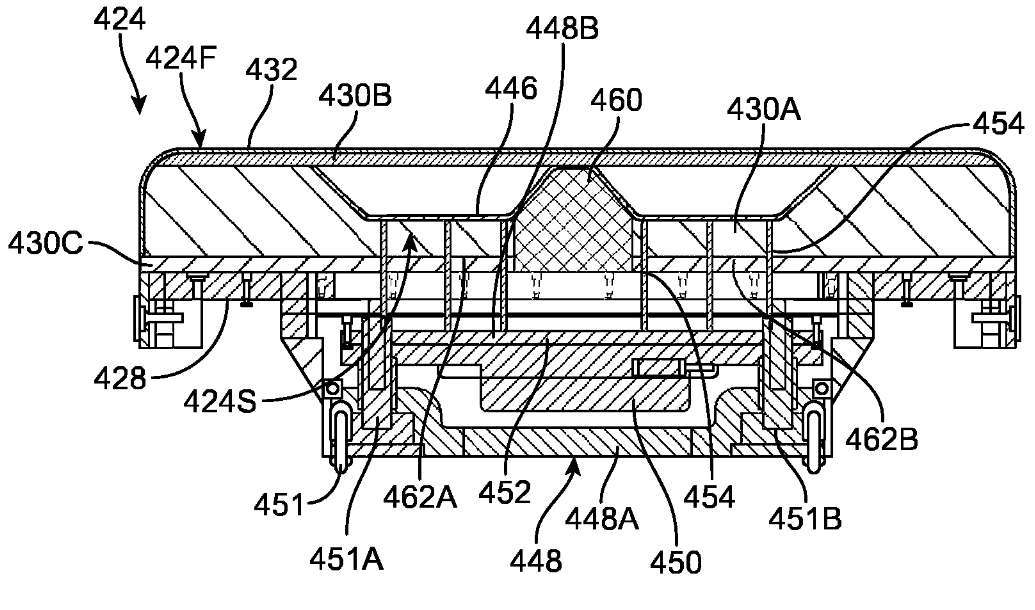
FIG. 4C is a simplified cutaway side view illustration of the body section and the actuator assembly illustrated in FIG. 4A, the body section being shown in the second (deformed) position.

FIG. 4C is a simplified cutaway side view illustration of the body section 424 illustrated in FIG. 4A, the body section 424 being shown in the second (deformed) position 424B. In particular, in this simplified drawing, the actuator adapter 452 has been pulled in a generally downward direction by the actuator(s) 450 and/or the one or more actuator drive components 451. Through the member connectors 454 that connect the actuator adapter 452 to the engagement member 446, the engagement member 446 is also pulled in a generally downward direction. As shown, the movement of the engagement member 446 in the generally downward direction causes the second support region 424S of the first resilient layer 430A to be deformed relative to the first support region 424F. With such deformation of the second support region 424S of the first resilient layer 430A, it is appreciated that the third resilient layer 430C will also move and/or be deformed in a generally downward direction, but the second resilient layer 430B and the section cover 432 will not be correspondingly deformed without an additional downward force on the body section 424 such as from the breasts of the user 10 (illustrated in FIG. 1).

FIG. 4C also illustrates the first deformation region 462A and the second deformation region 462B of the second support region 424S that are separated from one another by the support pad 460.

Thus, during use of the actuator assembly 422 to selectively deform the second support region 424S, i.e. each of the first deformation region 462A and the second deformation region 462B, relative to the first support region 424F of the first resilient layer 430A, the at least one actuator 450 actuates the one or more actuator drive components 451, i.e. the first actuator drive component 451A and the second actuator drive component 451B, to move linearly and/or provide a linear force in a generally downward direction, which, in turn, moves the actuator adapter 452 linearly in a generally downward direction. Due to the presence of the plurality of member connectors 454 that extend between the actuator adapter 452 and the engagement member 446, the downward force on the actuator adapter 454 pulls downward on the engagement member 446, which thus deforms the second support region 424S of the first resilient layer 430A relative to the first support region 424F of the first resilient layer 430A.

Additionally, in the non-exclusive implementation of FIG. 4C, the actuator subassembly 448 can further include (i) an actuator frame 448A that fixedly secures the at least one actuator 450 and/or the one or more actuator drive components 451 to the section base 428 or another structure; and (ii) an actuator intermediate mount 448B that connects the actuator(s) 450 and/or the actuator drive components 451 to the actuator adapter 452.

Figure 5A:
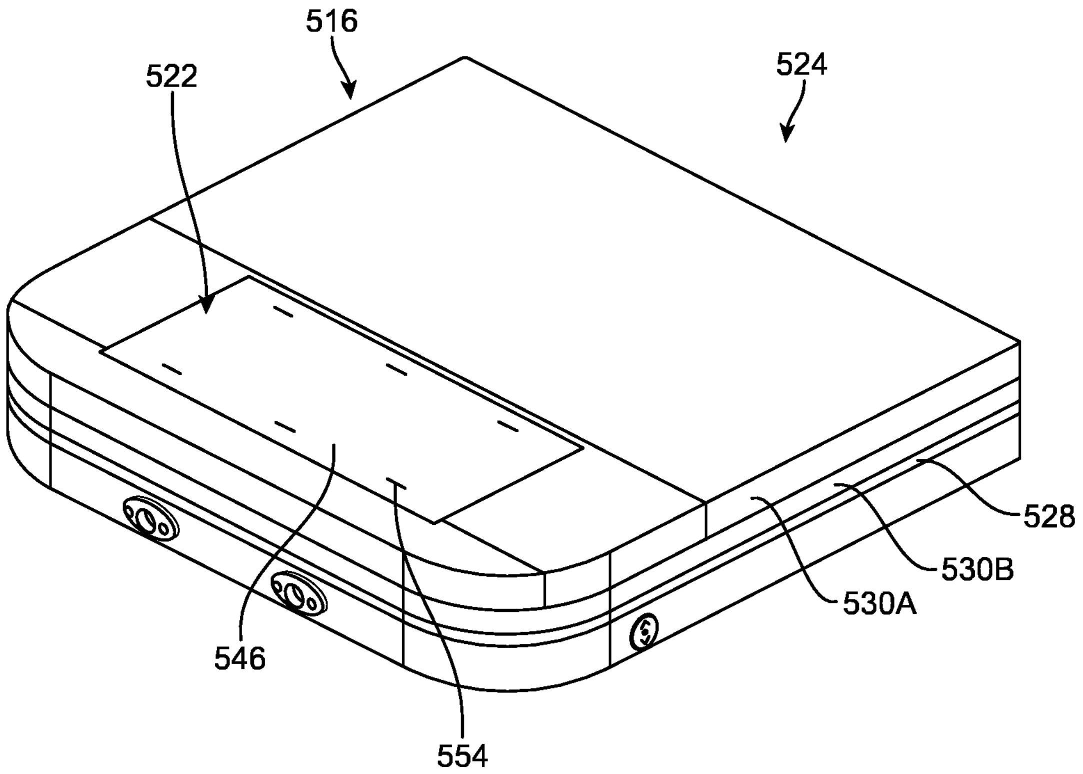
FIG. 5A is a top perspective view of a portion of yet another embodiment of the body section, and another embodiment of the actuator assembly that is configured to selectively deform a portion of the body section, and yet another embodiment of an actuator assembly that is configured to selectively deform a portion of the body section.

FIG. 5A is a top perspective view of a portion of yet another embodiment of the body section 524 of the device body 516, and yet another embodiment of the actuator assembly 522 that is configured to selectively deform a portion of the body section 524. In particular, FIG. 5A illustrates the first resilient layer 530A, the third resilient layer 530C and the section base 528 of the body section 524, and the engagement member 546 and the member connectors 554 of the actuator assembly 522.

The section body 524 can be substantially similar to any of the embodiments illustrated and described herein above. Accordingly, the section body 524 will not be described again in detail.

The actuator assembly 522 can have a design that is somewhat different than those illustrated in the previous embodiments. For example, as described in greater detail herein below, the member connectors 554 have a somewhat different design than the previous embodiments. Specific details of this embodiment of the actuator assembly 522 will be described in greater detail in relation to FIGS. 5B and 5C.

Figure 5B:
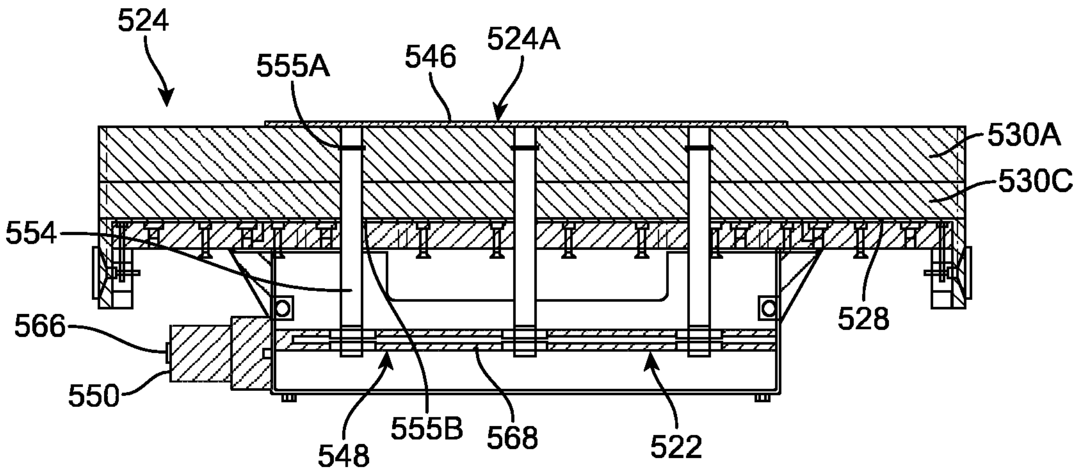
FIG. 5B is a simplified cutaway side view illustration of the body section and the actuator assembly illustrated in FIG. 5A, the body section being shown in a first (home) position.

FIG. 5B is a simplified cutaway side view illustration of the body section 524 and the actuator assembly 522 illustrated in FIG. 5A, the body section 524 being shown in a first (home) position 524A.

As noted above, in this embodiment, the actuator assembly 522 has a different design than those described in detail above. For example, as shown, the actuator 550 of the actuator assembly 522 has a different design, and the actuator assembly 522 and/or the actuator subassembly 548 are designed without the specific need for the actuator adapter. Alternatively, in another embodiment, the design of the actuator 550 can be substantially as shown, but with the actuator subassembly 548 still including the actuator adapter.

In this embodiment, as shown in FIG. 5B, the actuator 550 includes at least one motor 566, such as a rotary motor, and at least one shaft 568 that is coupled to the at least one motor 566. Additionally, as illustrated, the member connectors 554 can be provided in the form of straps that are coupled to and extend between the shaft 568 and the engagement member 546. As shown, the member connectors 554 extend through appropriate small openings or layer apertures 555A in the first resilient layer 530A and the third resilient layer 530C, and small openings or base apertures 555B in the section base 528, so that the member connectors 554 can be effectively coupled to the engagement member 546 that is positioned above and directly adjacent to the first resilient layer 530A. Alternatively, the member connectors 554 can have a different design while being coupled to and extending between the shaft 568 and the engagement member 546.

It is appreciated that the actuator assembly 522 can include any suitable number of member connectors 554. For example, in one non-exclusive embodiment, as shown, the actuator assembly 522 can include six member connectors 554. In particular, in one embodiment, the actuator assembly 522 can include two shafts 568, with three member connectors 554 being coupled to each shaft 568. The motor 566 can be configured to rotate each of the shafts 568 simultaneously. With this design, rotation of the shaft(s) 568 in one rotational direction causes the member connectors 544 to be wrapped over the shaft(s) 568, while rotation of the shaft(s) 568 in the opposite rotational direction causes the member connectors 544 to be unwrapped from the shaft(s) 568. Alternatively, a separate motor 566 can be provided to rotate each of the shafts 568. Still alternatively, the actuator assembly 522 can include greater than six or fewer than six member connectors 554.

Figure 5C:
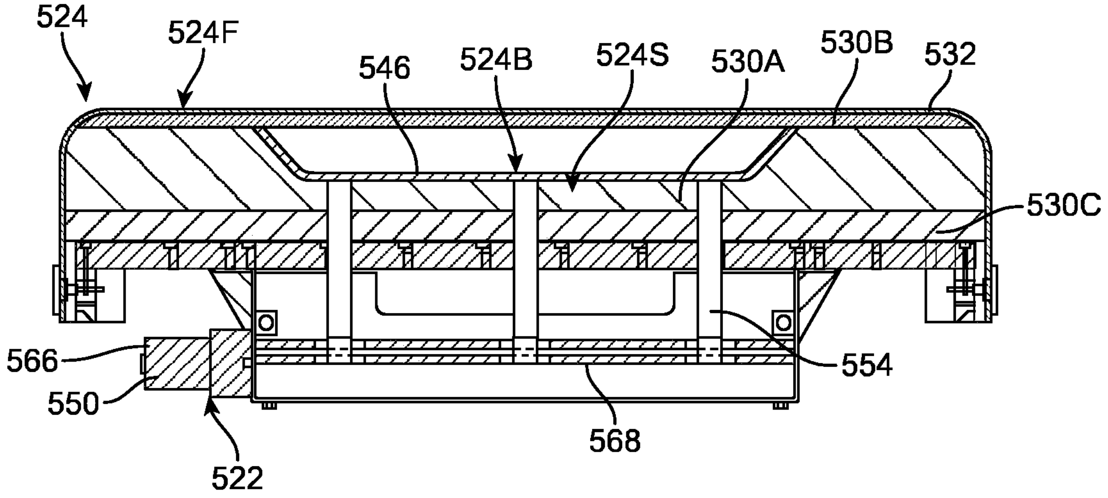
FIG. 5C is a simplified cutaway side view illustration of the body section and the actuator assembly illustrated in FIG. 5A, the body section being shown in the second (deformed) position.

FIG. 5C is a simplified cutaway side view illustration of the body section 524 and the actuator assembly 522 illustrated in FIG. 5A, the body section 524 being shown in the second (deformed) position 524B.

Additionally, FIG. 5C again shows that the actuator assembly 522 can include the actuator 550 including the motor 566 and the shaft 568, the engagement member 546, and the member connectors 554 that are coupled to and extend between the shaft 568 and the engagement member 546.

During use of the actuator assembly 522 for purposes of deforming the second support region 524S of the first resilient layer 530A relative to the first support region 524F, the motor 566 rotates the shaft 568 so that the member connectors 554, such as the straps, wrap around the shaft 568. The member connectors 554 being wrapped around the shaft 568 creates a downward force on the engagement member 546, and a corresponding downward force onto the second support region 524S of the first resilient layer 530A. Thus, the first resilient layer 530A and the third resilient layer 530C can be deformed in a desired manner, i.e. to a desired second (deformed) position relative to the second resilient layer 530B and the section cover 532, to provide the desired adjustable support for the user 10 (illustrated in FIG. 1) of the treatment device 12 (illustrated in FIG. 1).

Subsequently, when it is desired to move the second support region 524S back to the first (undeformed/uncompressed) position 524A (illustrated in FIG. 5B), the motor 566 rotates the shaft 568 in the opposite direction so that the member connectors 554 are unwrapped from around the shaft 568. Thus, the first resilient layer 530A and the third resilient layer 530C can then expand back to their natural condition because the engagement member 546 will no longer be being pulled downward against the second support region 524S of the first resilient layer 530A.

Figure 6A:
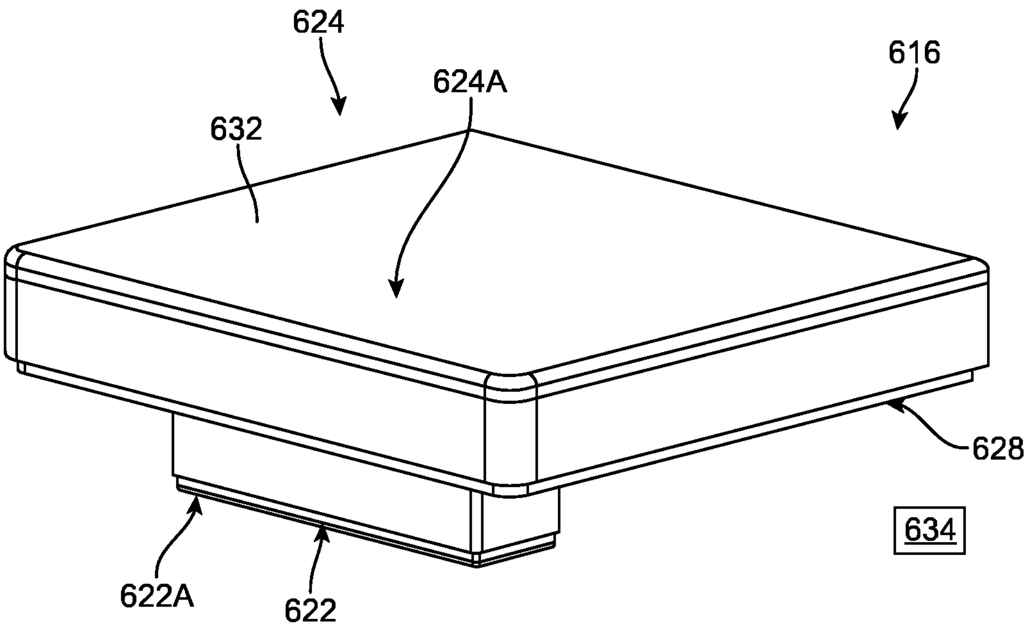
FIG. 6A is a simplified top perspective view illustration of still yet another embodiment of a body section of the device body that can be included as part of the treatment device illustrated in FIG. 1, the body section being shown in a first (home) position, and another embodiment of an actuator assembly that is configured to selectively deform a portion of the body section.

FIG. 6A is a simplified top perspective view illustration of still yet another embodiment of a body section 624 of the device body 616, such as the first body section 24X shown in FIG. 1, that can be included as part of the treatment device 12 illustrated in FIG. 1. Additionally, FIG. 6A also illustrates another embodiment of an actuator assembly 622 that can be included as part of the treatment device 12. As with previous embodiments, the actuator assembly 622 is configured to selectively deform a portion of the body section 624.

The body section 624 is adapted to support at least a portion of the user 10 (illustrated in FIG. 1) when the user 10 is positioned on the device body 616 for purposes of receiving a therapeutic treatment. In FIG. 6A, the body section 624 is shown in a first (home or undeformed) position 624A.

The body section 624 illustrated in FIG. 6A is substantially similar to the embodiments illustrated and described herein above. However, in this embodiment, there have been some minor modifications to the structure of the body section 624.

In various embodiments, the body section 624 again includes a rigid, section base 628, at least one resilient layer 630 (illustrated, for example, in FIG. 6C) that is positioned on top of the section base 628, and a section cover 632 that covers the at least one resilient layer 630 and secures the at least one resilient layer 630 to the section base 628. The section cover 632 is adapted to engage the user 10 when the user 10 is positioned on top of the treatment device 12.

Figure 6B:
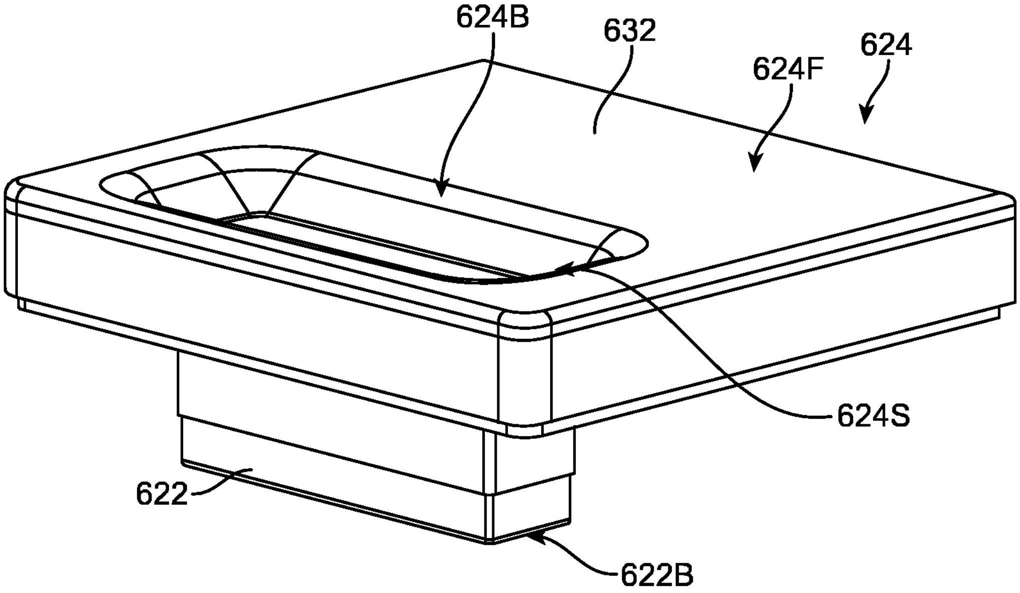
FIG. 6B is a simplified top perspective view of the body section and the actuator assembly illustrated in FIG. 6A, the body section being shown in a second (deformed) position.

The actuator assembly 622 is operatively coupled to the body section 624 for purposes of deforming a portion or support region of the at least one resilient layer 630 of the body section 624. In various embodiments, the actuator assembly 622 is movable between (i) a retracted configuration 622A, such as shown in FIG. 6A, which causes the body section 624 to be in the first (home or undeformed) position 624A, and (ii) an extended configuration 622B, such as shown in FIG. 6B, which causes the body section 624 to be in a second (deformed) position 624B, such as shown in FIG. 6B. However, regardless of whether the body section 624 is in the first (home or undeformed) position 624A, or in the second (deformed) position 624B, in certain implementations, the section cover 632 does not naturally deform without some outside force pushing down on the section cover 632 of the body section 624, such as with the user 10 being positioned thereon.

The actuator assembly 622 is substantially similar in design and function to the previous embodiments. However, there have been some modifications to the actuator assembly 622 which will be illustrated and described in relation to subsequent Figures.

FIG. 6A further illustrates an assembly controller 634 (illustrated as a box) that is configured to control operation of the actuator assembly 622. In particular, the assembly controller 634 is configured to control the actuator assembly 622 to selectively deform one or more regions of the at least one resilient layer 630 relative to other regions of the at least one resilient layer 630.

FIG. 6B is a simplified top perspective view of the body section 624 and the actuator assembly 622 illustrated in FIG. 6A, the actuator assembly 622 being shown in an extended configuration 622B and the body section 624 being shown in a corresponding second (deformed) position 624A. More particularly, FIG. 6B illustrates what the body section 624 would look like with the body section 624 in the second (deformed) position 624B and with a force (such as from the breasts of the user 10 (illustrated in FIG. 1)) pushing down on the section cover 632.

As shown in FIG. 6B, the second support region 624S is selectively deformed relative to the first support region 624F through the selective activation of the actuator assembly 622 to enable the user 10 to be positioned comfortably and conveniently in the prone position while on the treatment device 12. For example, in certain embodiments, the actuator assembly 622 is configured to selectively, directly or indirectly, pull down on and/or provide generally downward pressure on the second support region 624S of the first resilient layer 630A (illustrated in FIG. 6C) to deform the second support region 624S relative to the first support region 624F.

Substantially similar to the previous embodiments, the size and shape of the second support region 624S and the specific location of the second support region 624S can be varied depending on the size and shape of the user 10, and the area and/or body parts of the user 10 that are being adjustably supported within the second support region 624S. For example, the second support region 624S can have a particular size, shape and positioning so as to effectively align with and adjustably support the breasts and/or the stomach of the user 10 of the treatment device 12.

Figure 6C:
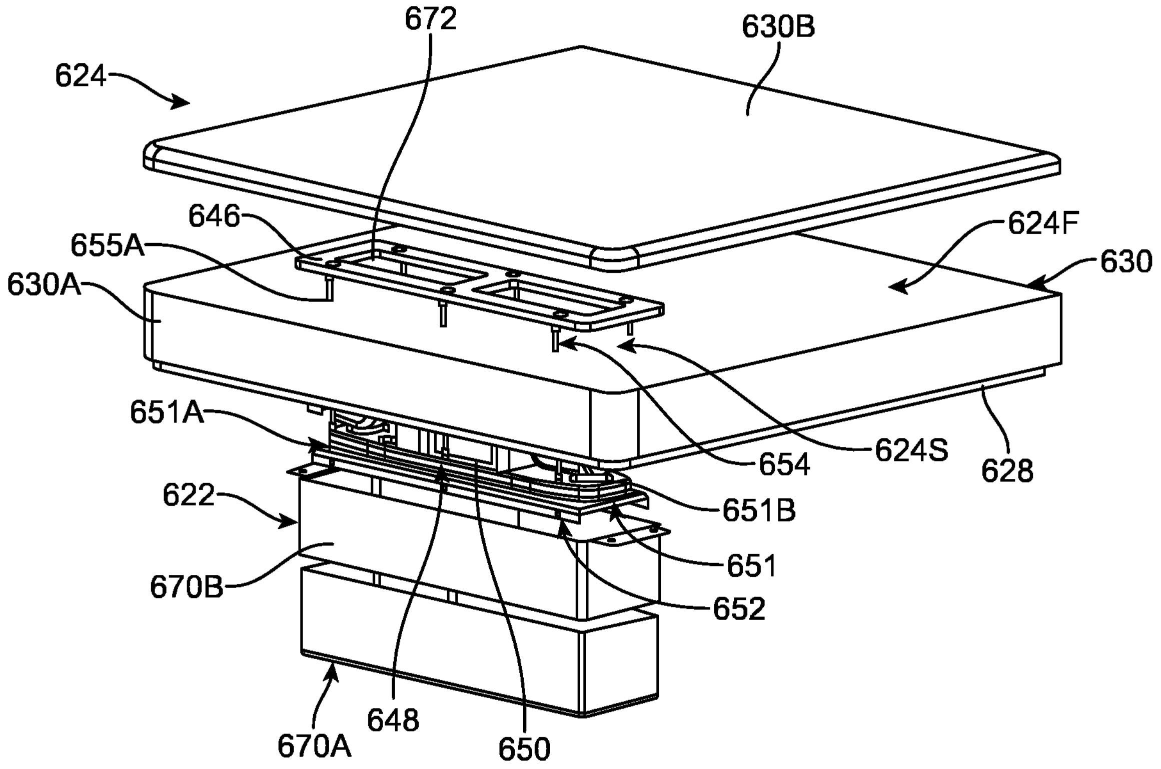
FIG. 6C is a partially exploded top perspective view of the body section and the actuator assembly illustrated in FIG. 6A.

FIG. 6C is a partially exploded top perspective view of the body section 624 and the actuator assembly 622 illustrated in FIG. 6A, with the section cover 632 (illustrated in FIG. 6A) being omitted for purposes of clarity. Additionally, FIG. 6C also illustrates various details of the actuator assembly 622.

In this embodiment, the body section 624 again includes the rigid, section base 628, the at least one resilient layer 630, and the section cover 632 that are substantially similar to the corresponding components in the previous embodiments.

The section base 628 supports at least a portion of the user 10 (illustrated in FIG. 1) receiving the therapeutic treatment when the user 10 is positioned on the treatment device 12 (illustrated in FIG. 1). The section base 628 is generally rigid and can again be made of a rigid material such as wood, aluminum, steel, plastic, or other suitable materials.

The at least one resilient layer 630 is secured to and can be positioned substantially on top of the section base 628. In this embodiment, the body section 624 includes a first resilient layer 630A, and a second resilient layer 630B. Alternatively, in other embodiments, the body section 624 can further include a third resilient layer that is similar in design, positioning and functioning as described in previous embodiments.

The first resilient layer 630A is configured to provide adjustable support for the user 10 of the treatment device 12. For example, the first resilient layer 630A can include the first support region 624F, and the second support region 624S which can be selectively deformed, e.g., with the actuator assembly 622, relative to the first support region 624F. The size, structure and functionality of the first resilient layer 630A can be substantially identical to what has been described in detail herein above, although it is appreciated that the thickness of the first resilient layer 630A may be varied due to the lack of a specific third resilient layer in this particular embodiment. Accordingly, such structure and detail will not be repeated herein.

The second resilient layer 630B is configured to be positioned on top of and to cover the first resilient layer 630A. Stated in another manner, the second resilient layer 630B is positioned between the first resilient layer 630A and the section cover 632. As with the previous embodiments, the second resilient layer 630B is again configured to not be deformed by the actuator assembly 622 as the actuator assembly 622 selectively deforms the second support region 624S of the first resilient layer 630A relative to the first support region 624F of the first resilient layer 630A.

As noted, the actuator assembly 622 is again configured to selectively deform the second support region 624S of the first resilient layer 630A relative to the first support region 624F of the first resilient layer 630A. The actuator assembly 622 is also configured to selectively deform the second support region 624S relative to the section base 628. In many embodiments, the actuator assembly 622 is further configured to selectively deform the second support region 624S relative to and independently of the second resilient layer 630B and the section cover 632.

In this embodiment, the actuator assembly 622 again includes an engagement member 646, an actuator subassembly 648 including at least one actuator 650, one or more actuator drive components 651 and an actuator adapter 652, and a plurality of member connectors 654. Additionally, in the embodiment, the actuator assembly 622 further includes a first housing member 670A and a second housing member 670B.

As illustrated, the engagement member 646 is positioned adjacent to and on top of the first resilient layer 630A. Additionally, the engagement member 646 is positioned substantially between the first resilient layer 630A and the second resilient layer 630B.

The design, shape, size and materials utilized for the engagement member 646 can be varied in a manner substantially similar to the embodiments described herein above. For example, in one embodiment, as shown in FIG. 6C, the engagement member 646 can be rigid and can be formed from one or more rigid materials such as wood, aluminum, steel, plastic, or other suitable materials. Alternatively, the engagement member 646 can be formed from other suitable materials. Still alternatively, the engagement member 646 can be flexible.

Additionally, as shown in this embodiment, the engagement member 646 can include one or more member cutouts 672 that are formed into the overall structure of the engagement member 646. For example, in this embodiment, the engagement member 646 includes two member cutouts 672. Alternatively, the engagement member 646 can have more than two member cutouts 672 or only a single member cutout 672. The member cutouts 672 can somewhat reduce the overall weight of the engagement member 646, and can also aid in the compression of the first resilient layer 630A.

The at least one actuator 650 and the one or more actuator drive members 651, such as a first actuator drive member 651A and a second actuator drive member 651B, are substantially similar in design and function as those described in detail herein above. For example, the at least one actuator 650 can again be any suitable type of linear actuator for purposes of selectively actuating the one or more actuator drive components 651 to selectively deform the second support region 624S of the first resilient layer 630A relative to the first support region 624F of the first resilient layer 630A. With such design, the at least one actuator 650 can selectively actuate the one or more actuator drive components 651 to generate a linear force to selectively pull down on the engagement member 646, such as via the actuator adapter 652 and the plurality of member connectors 654.

In this embodiment, the actuator adapter 652 can again be a flat, rigid, oval-shaped or rectangular-shaped plate. However, in this embodiment, the actuator adapter 652 is positioned below the at least one actuator 650 and away from the section base 628. Thus, in this embodiment, the at least one actuator 650 and the one or more actuator drive components 651 will cooperate to function in a push mode by pushing down on the actuator adapter 652 during movement of the actuator assembly from the retracted configuration 622A (as shown in FIG. 6A) to the extended configuration 622B (as shown in FIG. 6B). Alternatively, in other embodiments such as illustrated and described in detail herein above, the actuator adapter 652 can be positioned substantially adjacent to the section base 628, and the at least one actuator 650 and the one or more actuator drive components 651 can cooperate to function in a pull mode by pulling down on the actuator adapter 652 during movement of the actuator assembly from the retracted configuration 622A to the extended configuration 622B.

The plurality of member connectors 654 are fixedly connected to and extend between the engagement member 646 and the actuator adapter 652. As shown, in order to effectively extend between the engagement member 646 and the actuator adapter 652, the plurality of member connectors 654 are also configured to extend through the first resilient layer 630A (e.g., via small access apertures formed into the first resilient layer 630A). Stated in another fashion, in one implementation, each member connector 654 extends through a separate, small, layer aperture 655A in the first resilient layer 630A. It is further appreciated that the member connectors 654 will also extend through the section base 628, such as via small access apertures formed into the section base 628.

The actuator assembly 622 can again include any suitable number of member connectors 654 and/or the member connectors 654 can have any suitable design and be made from any suitable materials. For example, in one non-exclusive alternative embodiment, the actuator assembly 622 can include six member connectors 654 that are each formed as thin, flexible, wire-like cords or cables. Alternatively, the actuator assembly 622 can include greater than six or fewer than six member connectors 654. Still alternatively, the member connectors 654 can have another suitable design.

Thus, during use of the actuator assembly 622 to selectively deform the second support region 624S relative to the first support region 624F of the first resilient layer 630A, the actuator 650 actuates the one or more actuator drive components 651 to move linearly and/or provide a linear force in a generally downward direction, which, in turn, moves the actuator adapter 652 linearly in a generally downward direction. Due to the presence of the plurality of member connectors 654 that extend between the actuator adapter 652 and the engagement member 646, the downward force on the actuator adapter 654 pulls downward on the engagement member 646, which thus deforms the second support region 624S of the first resilient layer 630A relative to the first support region 624F of the first resilient layer 630A, due to the second support region 624S of the first resilient layer 630A being compressed against the rigid, stationary, section base 628.

The first housing member 670A and the second housing member 670B cooperate to provide a protective housing for various components of the actuator assembly 622. In various embodiments, the first housing member 670A is movably coupled to the second housing member 670B such that the first housing member 670A moves relative to the second housing member 670B as the actuator assembly 622 is moved between the retracted configuration 622A (illustrated in FIG. 6A) and the extended configuration 622B (illustrated in FIG. 6B). In some embodiments, the first housing member 670A is telescopingly coupled to the second housing member 670B such that the first housing member 670A moves in a telescoping manner relative to the second housing member 670B as the actuator assembly 622 is moved between the retracted configuration 622A and the extended configuration 622B. In one embodiment, the first housing member 670A is positioned partially within the second housing member 670B to enable such telescoping movement between the first housing member 670A and the second housing member 670B. Alternatively, in another embodiment, the second housing member 670B can be positioned partially within the first housing member 670A to enable such telescoping movement between the first housing member 670A and the second housing member 670B.

The first housing member 670A and the second housing member 670B can be formed from any suitable materials. For example, in certain non-exclusive embodiments, the first housing member 670A and the second housing member 670B can be formed from rigid materials such as sheet metal, cold-rolled steel, aluminum, wood, plastic, or other suitable rigid materials. Alternatively, the first housing member 670A and the second housing member 670B can be formed from other suitable materials.

Figure 6D:
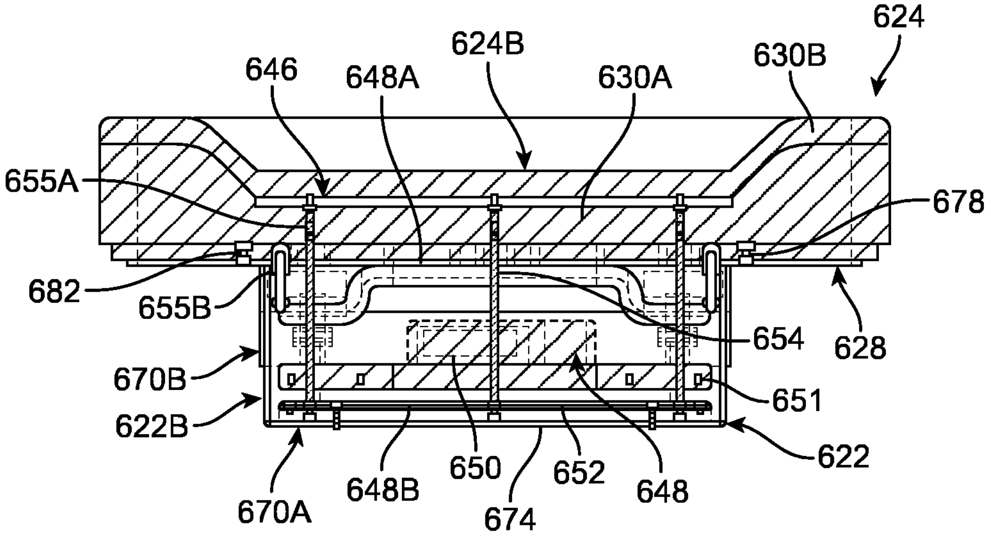
FIG. 6D is a simplified cutaway side view illustration of the body section and the actuator assembly illustrated in FIG. 6A, the body section being shown in the second (deformed) position.

FIG. 6D is a simplified cutaway side view illustration of a portion of the body section 624 and the actuator assembly 622 illustrated in FIG. 6A, the body section 624 being shown in the second (deformed) position 624B.

As illustrated in FIG. 6D, the at least one actuator 650 is coupled to the actuator adapter 652 via the one or more actuator drive components 651 such that linear movement of the actuator drive components 651 as actuated by the actuator(s) 650 results in a corresponding linear movement of the actuator adapter 652. Additionally, the plurality of member connectors 654 are fixedly connected to and extend between the engagement member 646 and the actuator adapter 652. As shown, in order to effectively extend between the engagement member 646 and the actuator adapter 652, the plurality of member connectors 654 are also configured to extend through the first resilient layer 630A (e.g., via small access apertures formed into the first resilient layer 630A) and the section base 628 (e.g. via small access apertures formed into the section base 628). Stated in another fashion, in one implementation, each member connector 654 extends through a separate, small, layer aperture 655A in the first resilient layer 630A, and a separate, small, base aperture 655B in the section base 628.

Additionally, in the non-exclusive implementation of FIG. 6D, the actuator subassembly 648 can further include (i) an actuator frame 648A that fixedly secures the at least one actuator 650 and/or the actuator drive components 651 to the section base 628 or another structure; and (ii) an actuator intermediate mount 648B that connects the actuator (s) 650 and/or the actuator drive components 651 to the actuator adapter 652.

As also illustrated in FIG. 6D, the actuator adapter 652 is positioned substantially adjacent to and/or is coupled to the first housing member 670A of the actuator assembly 622, such as to a bottom surface 674 of the first housing member 670A. Thus, movement of the actuator adapter 652 in the generally vertical direction causes a corresponding movement of the first housing member 670A relative to the second housing member 670B as the actuator assembly 622 is moved between the contracted configuration and the expanded configuration.

In FIG. 6D, the actuator assembly 622 has moved the actuator adapter 652 downward, and this causes the engagement member 646 to pull the first resilient layer 630A downward. It should be noted that in FIG. 6D, the second resilient layer 630B is illustrated as being depressed as well. This can be caused by pressure applied by the user 10 (illustrated in FIG. 1). Alternatively, the bottom of the second resilient layer 630B can be physically secured to the engagement member 646 so that these components move substantially concurrently.

Figure 6E:
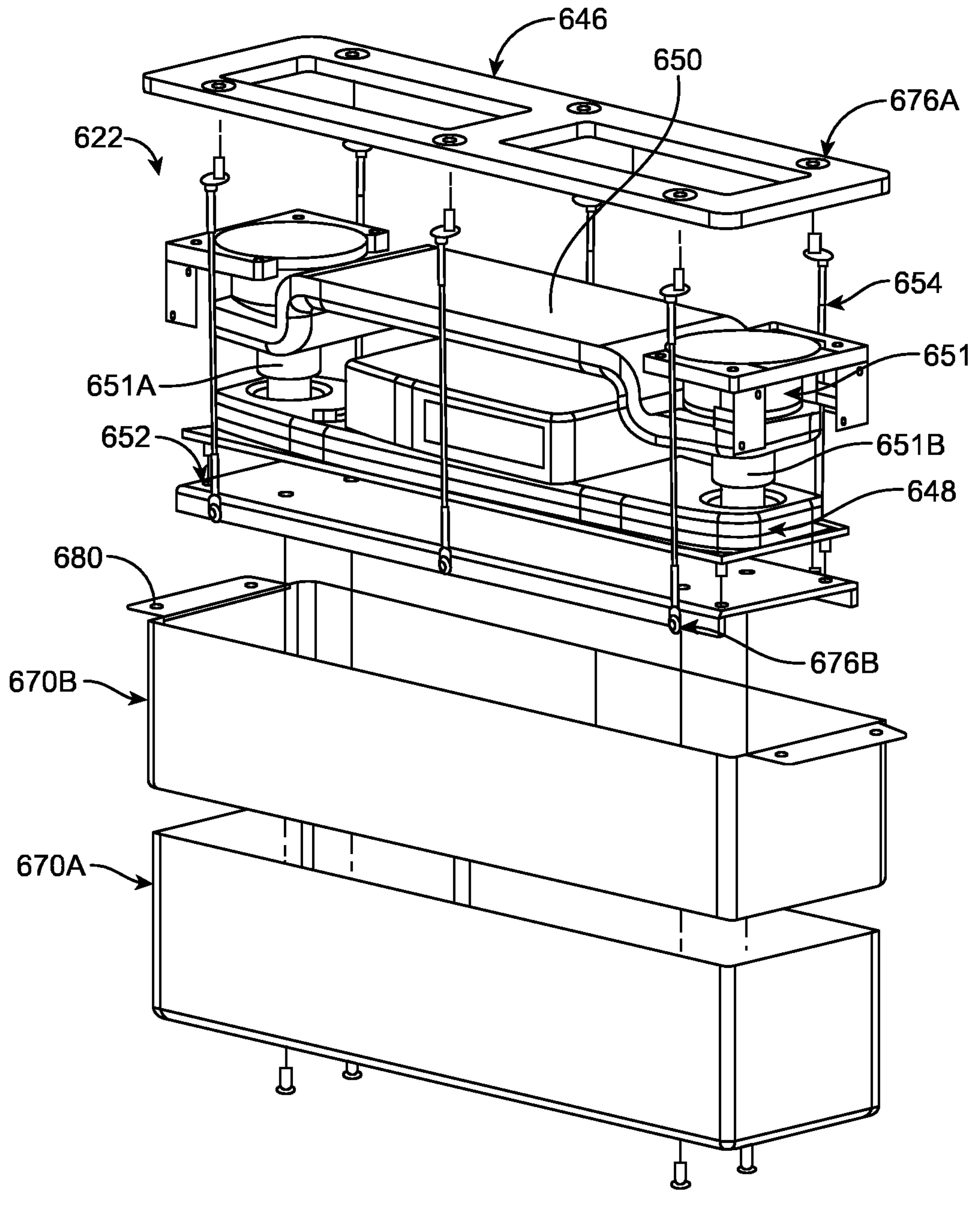
FIG. 6E is an exploded top perspective view of the actuator assembly illustrated in FIG. 6A.

FIG. 6E is an exploded top perspective view of the actuator assembly 622 illustrated in FIG. 6A. More specifically, FIG. 6E clearly illustrates various components of the actuator assembly 622. In particular, FIG. 6E provides additional clear views of the engagement member 646, the actuator subassembly 648 including the at least one actuator 650, the one or more actuator drive components 651, such as the first actuator drive component 651A and the second actuator drive component 651B, and the actuator adapter 652, the spaced apart member connectors 654, the first housing member 670A and the second housing member 670B.

FIG. 6E further illustrates the first coupling points 676A where the member connectors 654 are coupled to the engagement member 646, and second coupling points 676B where the member connectors 654 are coupled to the actuator adapter 652.

As also illustrated in FIG. 6D and FIG. 6E, the second housing member 670B can be fixedly coupled to the section base 628 (illustrated in FIG. 6D) via a plurality of housing attachers 678 (illustrated in FIG. 6D) that extend through coupling apertures 680 (illustrated in FIG. 6E) that are formed into the second housing member 670B and into second base apertures 682 (illustrated in FIG. 6D) that are formed into the second base 628. In one non-exclusive embodiment, the actuator assembly 622 can include four housing attachers 678 that each extend through one of four coupling apertures 680 that are formed into the second housing member 670B and into one of four second base apertures 682 that are formed into the second base 628. Alternatively, the actuator assembly 622 can have more than four or fewer than four housing attachers 678, coupling apertures 680 and second base apertures 682.

Figure 7A:
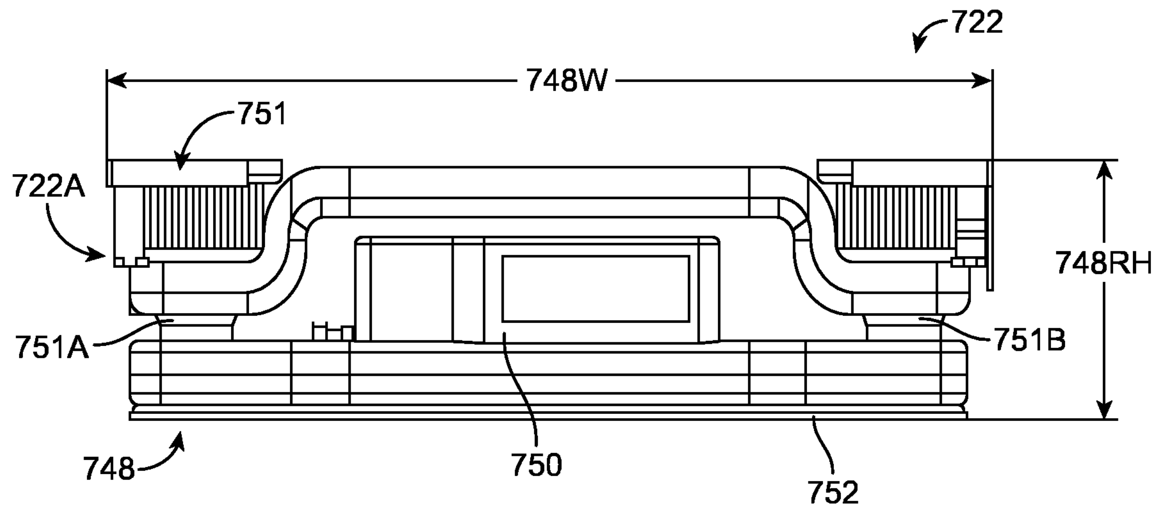
FIG. 7A is a simplified side view illustration of a portion of an embodiment of the actuator assembly, the actuator assembly being shown in a contracted configuration.

FIG. 7A is a simplified side view illustration of a portion of one, non-exclusive implementation of the actuator assembly 722. More specifically, FIG. 7A illustrates a simplified side view of the actuator subassembly 748 of the actuator assembly 722. As shown in FIG. 7A, the actuator assembly 722 and/or the actuator subassembly 748 is in a retracted configuration 722A.

In particular, FIG. 7A illustrates that the actuator subassembly 748 can include at least one actuator 750, one or more actuator drive components 751, such as the first actuator drive component 751A and the second actuator drive component 751B, and the actuator adapter 752. Such components are substantially similar in overall design and function as has been described in detail herein above. Accordingly, no detailed described will again be provided.

FIG. 7A also illustrates an assembly width 748W of the actuator subassembly 748. In certain non-exclusive embodiments, the assembly width 748W of the actuator subassembly 748 can be between approximately 300 millimeters and 600 millimeters. In one specific embodiment, the assembly width 748W of the actuator subassembly 748 can be approximately 440 millimeters. Alternatively, the assembly width 748W of the actuator subassembly 748 can be greater than 600 millimeters or less than 300 millimeters.

Also shown in FIG. 7A is a retracted assembly height 748RH of the actuator subassembly 748. In certain non-exclusive embodiments, the retracted assembly height 748RH of the actuator subassembly 748 can be between approximately 50 millimeters and 150 millimeters. In one specific embodiment, the retracted assembly height 748RH of the actuator subassembly 748 can be approximately 100 millimeters. Alternatively, the retracted assembly height 748RH of the actuator subassembly 748 can be greater than 150 millimeters or less than 50 millimeters.

Figure 7B:
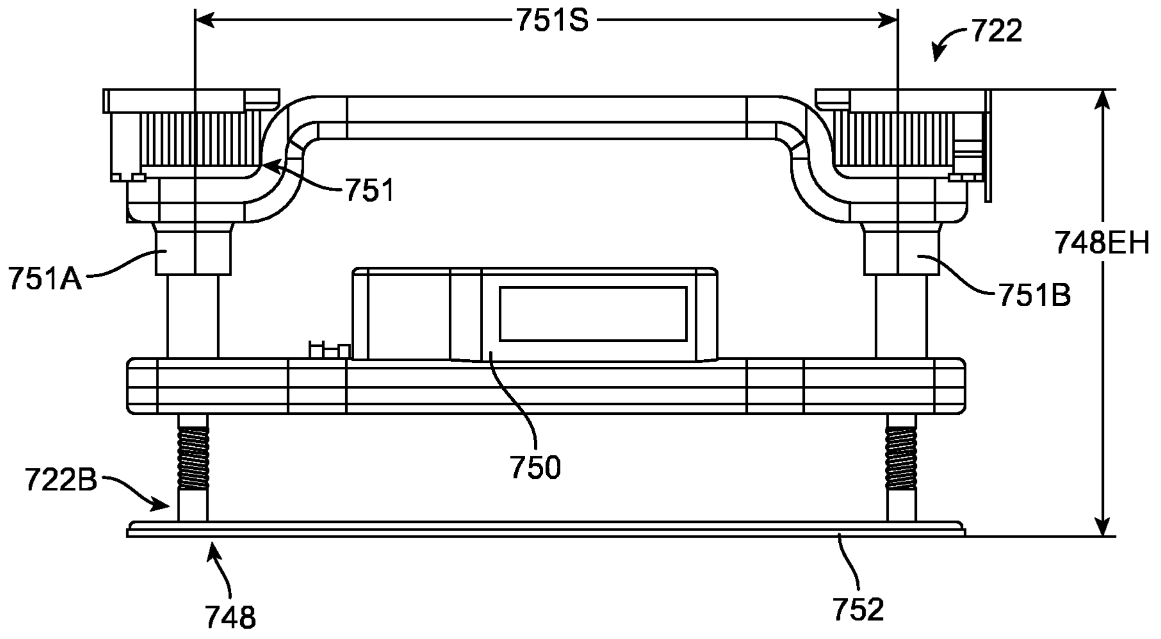
FIG. 7B is a simplified side view illustration of the portion of the actuator assembly illustrated in FIG. 7A, the actuator assembly being shown in an expanded configuration.

FIG. 7B is a simplified side view illustration of the portion of the actuator assembly 722 illustrated in FIG. 7A. More specifically, FIG. 7B illustrates a simplified side view of the actuator subassembly 748 of the actuator assembly 722. As shown in FIG. 7B, the actuator assembly 722 is in an extended configuration 722B.

FIG. 7B again illustrates that the actuator subassembly 748 can include at least one actuator 750, one or more actuator drive components 751, such as the first actuator drive component 751A and the second actuator drive component 751B, and the actuator adapter 752. Such components are substantially similar in overall design and function as has been described in detail herein above. Accordingly, no detailed described will again be provided.

FIG. 7B also illustrates drive component spacing 751S between the first actuator drive component 751A and the second actuator drive component 751B. In certain non-exclusive embodiments, the drive component spacing 751S between the first actuator drive component 751A and the second actuator drive component 751B can be between approximately 250 millimeters and 450 millimeters. In one specific embodiment, the drive component spacing 751S between the first actuator drive component 751A and the second actuator drive component 751B can be approximately 350 millimeters. Alternatively, the drive component spacing 751S between the first actuator drive component 751A and the second actuator drive component 751B can be greater than 450 millimeters or less than 250 millimeters.

Also shown in FIG. 7B is an extended assembly height 748EH of the actuator subassembly 748. In certain non-exclusive embodiments, the extended assembly height 748EH of the actuator subassembly 748 can be between approximately 150 millimeters and 250 millimeters. In one specific embodiment, the extended assembly height 748EH of the actuator subassembly 748 can be approximately 200 millimeters. Alternatively, the extended assembly height 748EH of the actuator subassembly 748 can be greater than 250 millimeters or less than 150 millimeters.

Figure 7C:
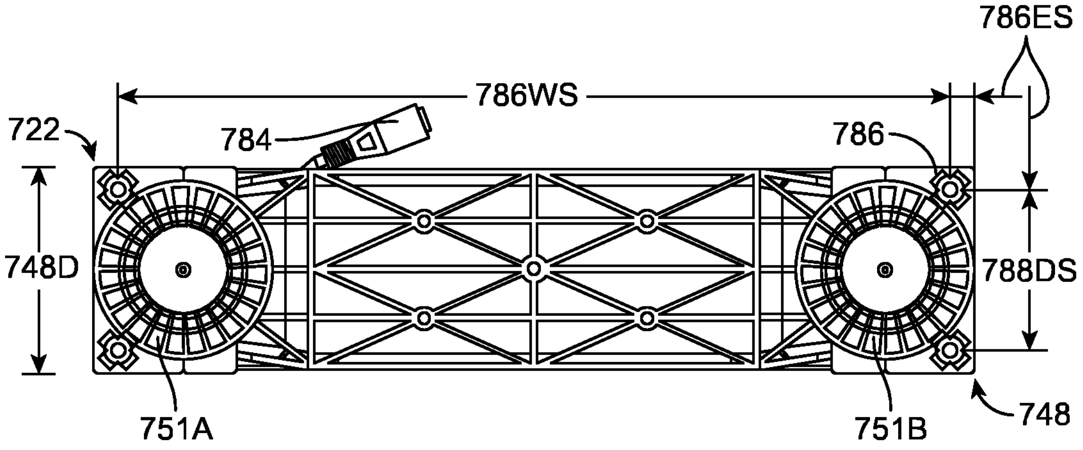
FIG. 7C is a simplified top view illustration of the portion of the actuator assembly illustrated in FIG. 7A.

FIG. 7C is a simplified top view illustration of the portion of the actuator assembly 722 illustrated in FIG. 7A. More specifically, FIG. 7C illustrates a simplified top view of the actuator subassembly 748 of the actuator assembly 722.

In particular, FIG. 7C shows the first actuator drive component 751A and the second actuator drive component 751B, and the actuator electrical connector 784 that is configured to provide necessary electrical connection between the actuator(s) 750 (illustrated in FIG. 7A) and the actuator drive components 751A, 751B.

As further illustrated in FIG. 7C, the actuator subassembly 748 has an assembly depth 748D. In certain non-exclusive embodiments, the assembly depth 748D can be between approximately 80 millimeters and 140 millimeters. In one specific embodiment, the assembly depth 748D can be approximately 104 millimeters. Alternatively, the assembly depth 748D can be greater than 140 millimeters or less than 80 millimeters.

FIG. 7C also shows a plurality of assembly attachers 786 that are configured to attach the actuator subassembly 748 to the section base 628 (illustrated in FIG. 6A) of the body section 624 (illustrated in FIG. 6A). In one embodiment, the actuator subassembly 748 can include four assembly attachers 786, with one assembly attacher 786 positioned near a different corner of the actuator subassembly 748. Alternatively, the actuator subassembly 748 can include a different number of assembly attachers 786 and/or the assembly attachers 786 can be positioned in another suitable manner.

FIG. 7C also illustrates an attacher width spacing 786WS between the assembly attachers 786 along a width of the actuator subassembly 748, and an attacher depth spacing 786DS between the assembly attachers 786 along a depth of the actuator subassembly 748. Also shown is an attacher edge spacing 786ES along both the width and depth directions.

Figure 7D:
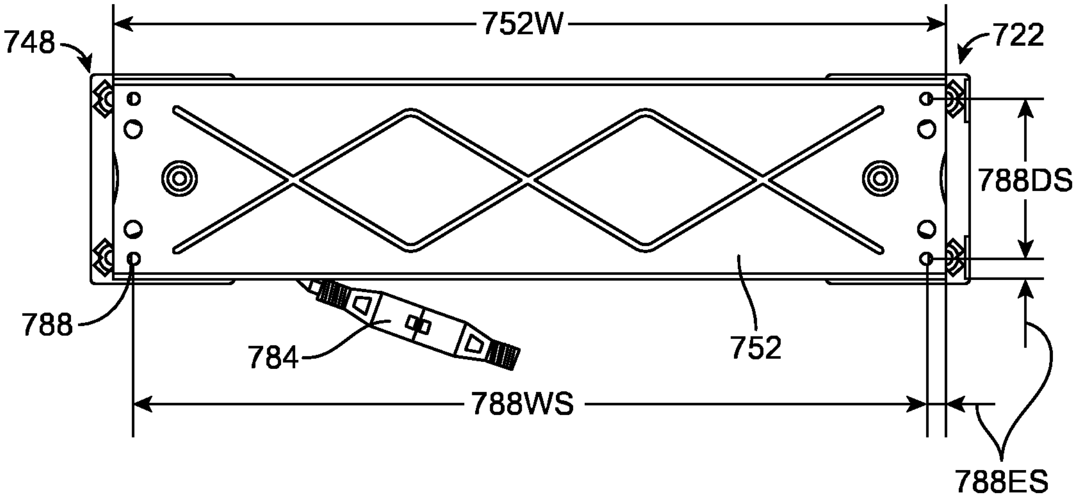
FIG. 7D is a simplified bottom view illustration of the portion of the actuator assembly illustrated in FIG. 7A.

FIG. 7D is a simplified bottom view illustration of the portion of the actuator assembly 722 illustrated in FIG. 7A. More specifically, FIG. 7D illustrates a simplified bottom view of the actuator subassembly 748 of the actuator assembly 722, which illustrates the actuator adapter 752. FIG. 7D also again illustrates the actuator electrical connector 784 that is configured to provide necessary electrical connection between the actuator(s) 750 (illustrated in FIG. 7A) and the actuator drive components 751A, 751B (illustrated in FIG. 7A).

As further illustrated in FIG. 7D, the actuator adapter 752 has an adapter width 752W. In certain non-exclusive embodiments, the adapter width 752W can be between approximately 280 millimeters and 560 millimeters. In one specific embodiment, the adapter width 752W can be approximately 416 millimeters. Alternatively, the adapter width 752W can be greater than 560 millimeters or less than 280 millimeters.

FIG. 7D also shows a plurality of adapter coupling apertures 788, as well as adapter coupling width spacing 788WS, adapter coupling depth spacing 788DS, and adapter coupling edge spacing 788ES.

It is understood that although a number of different embodiments of the treatment device 12 have been illustrated and described herein, one or more features of any one embodiment can be combined with one or more features of one or more of the other embodiments, provided that such combination satisfies the intent of the present invention.

While a number of exemplary aspects and embodiments of the treatment device 12 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A treatment device for supporting a user during a therapeutic treatment, the treatment device comprising:

a device body that is configured to support the user during the therapeutic treatment, the device body including a first body section that is adapted to support at least a portion of the user during the therapeutic treatment, the first body section having (i) a rigid, section base, (ii) a first resilient layer that is positioned near the section base, the first resilient layer including a first support region and a second support region, and (iii) a section cover that covers at least a portion of the first resilient layer, the section cover being adapted to engage the user; and an actuator assembly that is configured to selectively deform the second support region relative to the first support region;

wherein the first body section includes a second resilient layer that covers the first resilient layer and that is positioned between the first resilient layer and the section cover; and wherein the actuator assembly is configured to selectively deform the second support region relative to and independently of the second resilient layer.

2. The treatment device of claim 1 wherein the actuator assembly is configured to selectively deform the second support region relative to the section base.

3. The treatment device of claim 2 wherein the actuator assembly is configured to selectively deform the second support region relative to and independently of the section cover.

4. The treatment device of claim 1 wherein the second support region is substantially oval-shaped.

5. The treatment device of claim 1 wherein at least one of the resilient layers includes a piece of foam.

6. The treatment device of claim 1 wherein each of the resilient layers includes a piece of foam.

7. The treatment device of claim 1 wherein the first body section includes a third resilient layer that is positioned between the first resilient layer and the section base; and wherein the actuator assembly is configured to selectively deform a portion of the third resilient layer concurrently with the selective deformation of the second support region of the first resilient layer.

8. The treatment device of claim 1 wherein the actuator assembly includes (i) an engagement member positioned between the first resilient layer and the second resilient layer; (ii) an actuator subassembly that is positioned below the second resilient layer; and (iii) a plurality of spaced apart, member connectors that connect the engagement member to the actuator subassembly through the first resilient layer; and wherein the actuator subassembly is controlled to selectively pull the engagement member via the member connectors to selectively deform the second support region.

9. The treatment device of claim 8 wherein the member connectors connect the engagement member to the actuator subassembly through the second support region of the first resilient layer.

10. The treatment device of claim 8 wherein the engagement member is formed from a flexible material.

11. The treatment device of claim 8 wherein the engagement member is formed from a rigid material.

12. A treatment device of claim 1 for supporting a user during a therapeutic treatment, the treatment device comprising:

a device body that is configured to support the user during the therapeutic treatment, the device body including a first body section that is adapted to support at least a portion of the user during the therapeutic treatment, the first body section having (i) a rigid, section base, (ii) a first resilient layer that is positioned near the section base, the first resilient layer including a first support region and a second support region, and (iii) a section cover that covers at least a portion of the first resilient layer, the section cover being adapted to engage the user; and an actuator assembly that is configured to selectively deform the second support region relative to the first support region;

wherein the first resilient layer includes (i) a first layer section that includes at least a portion of the first support region, and (ii) a second layer section that includes at least a portion of the second support region; and wherein the first layer section has a first layer resilience that is different from a second layer resilience of the second layer section.

13. A treatment device of claim 1 for supporting a user during a therapeutic treatment, the treatment device comprising:

a device body that is configured to support the user during the therapeutic treatment, the device body including a first body section that is adapted to support at least a portion of the user during the therapeutic treatment, the first body section having (i) a rigid, section base, (ii) a first resilient layer that is positioned near the section base, the first resilient layer including a first support region and a second support region, and (iii) a section cover that covers at least a portion of the first resilient layer, the section cover being adapted to engage the user; and an actuator assembly that is configured to selectively deform the second support region relative to the first support region;

wherein the first resilient layer includes a layer relief that influences the deformation of the second support region relative to the first support region.

14. A treatment device of claim 1 for supporting a user during a therapeutic treatment, the treatment device comprising:

a device body that is configured to support the user during the therapeutic treatment, the device body including a first body section that is adapted to support at least a portion of the user during the therapeutic treatment, the first body section having (i) a rigid, section base, (ii) a first resilient layer that is positioned near the section base, the first resilient layer including a first support region and a second support region, and (iii) a section cover that covers at least a portion of the first resilient layer, the section cover being adapted to engage the user; and an actuator assembly that is configured to selectively deform the second support region relative to the first support region;

wherein the actuator assembly includes (i) an engagement member that is positioned between the first resilient layer and the section cover; (ii) an actuator subassembly, at least a portion of the actuator subassembly being positioned below the section base; and (iii) a plurality of spaced apart, member connectors that connect the engagement member to the actuator subassembly through the first resilient layer; and wherein the actuator subassembly is controlled to selectively pull the engagement member via the member connectors to selectively deform the second support region.

15. The treatment device of claim 14 wherein the engagement member is formed from a flexible material.

16. The treatment device of claim 14 wherein the engagement member is formed from a rigid material.

17. The treatment device of claim 1 wherein the device body includes a second body section that is adapted to support at least a second portion of the user during the therapeutic treatment; and wherein at least one of the body sections is configured to be selectively moved relative to the other body section.

18. The treatment device of claim 1 wherein the second support region is shaped somewhat similar to a pair of circles.

19. A treatment device for supporting a user during a therapeutic treatment, the treatment device comprising:

a device body that is configured to support the user during the therapeutic treatment, the device body including (i) a rigid, section base, (ii) a first resilient layer that is positioned on top of the section base, and (iii) a section cover that covers the first resilient layer, the section cover being adapted to engage the user; and an actuator assembly that is configured to selectively deform at least a portion of the first resilient layer to selectively adjust the support characteristics of the device body;

wherein the actuator assembly is configured to selectively deform the first resilient layer relative to the section base.

20. A treatment device for supporting a user during a therapeutic treatment, the treatment device comprising:

a device body that is configured to support the user during the therapeutic treatment, the device body including (i) a rigid, section base, (ii) a first resilient layer that is positioned on top of the section base, and (iii) a section cover that covers the first resilient layer, the section cover being adapted to engage the user; and an actuator assembly that is configured to selectively deform at least a portion of the first resilient layer to selectively adjust the support characteristics of the device body;

wherein the device body includes a second resilient layer that covers the first resilient layer and that is positioned between the first resilient layer and the section cover; and wherein the actuator assembly is configured to selectively deform the first resilient layer relative to and independently of the second resilient layer.

21. A treatment device for supporting a user during a therapeutic treatment, the treatment device comprising:

a device body that is configured to support the user during the therapeutic treatment, the device body including (i) a rigid, section base, (ii) a first resilient layer that is positioned on top of the section base, and (iii) a section cover that covers the first resilient layer, the section cover being adapted to engage the user; and an actuator assembly that is configured to selectively deform at least a portion of the first resilient layer to selectively adjust the support characteristics of the device body;

wherein the actuator assembly is configured to selectively deform the first resilient layer relative to and independently of the section cover.

22. The treatment device of claim 20 wherein each of the resilient layers includes a piece of foam.

23. The treatment device of claim 20 wherein the device body includes a third resilient layer that is positioned between the first resilient layer and the section base; and wherein the actuator assembly is configured to selectively deform the third resilient layer concurrently with the selective deformation of the first resilient layer.

24. The treatment device of claim 20 wherein the actuator assembly includes (i) an engagement member positioned between the first resilient layer and the second resilient layer; (ii) an actuator subassembly that is positioned below the second resilient layer; and (iii) a plurality of spaced apart, member connectors that connect the engagement member to the actuator subassembly through the first resilient layer; and wherein the actuator subassembly is controlled to selectively pull the engagement member via the member connectors to selectively deform the at least a portion of the first resilient layer.

25. The treatment device of claim 24 wherein the engagement member is formed from a felt material.

26. The treatment device of claim 24 wherein the engagement member is formed from a rigid material.

27. The treatment device of claim 20 wherein at least one of the resilient layers includes a piece of foam.

* * * * *